United States Patent
Su et al.

(10) Patent No.: US 12,272,039 B2
(45) Date of Patent: Apr. 8, 2025

(54) EFFICIENT USER-DEFINED SDR-TO-HDR CONVERSION WITH MODEL TEMPLATES

(71) Applicant: DOLBY LABORATORIES LICENSING CORPORATION, San Francisco, CA (US)

(72) Inventors: Guan-Ming Su, Fremont, CA (US); Harshad Kadu, Santa Clara, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 345 days.

(21) Appl. No.: 17/635,684

(22) PCT Filed: Aug. 12, 2020

(86) PCT No.: PCT/US2020/046032
§ 371 (c)(1),
(2) Date: Feb. 15, 2022

(87) PCT Pub. No.: WO2021/030506
PCT Pub. Date: Feb. 18, 2021

(65) Prior Publication Data
US 2022/0301124 A1    Sep. 22, 2022

Related U.S. Application Data

(60) Provisional application No. 62/887,123, filed on Aug. 15, 2019.

(30) Foreign Application Priority Data

Aug. 15, 2019 (EP) ..................... 19191921

(51) Int. Cl.
*G06T 5/92* (2024.01)

(52) U.S. Cl.
CPC ...... *G06T 5/92* (2024.01); *G06T 2207/10024* (2013.01); *G06T 2207/20081* (2013.01); *G06T 2207/20208* (2013.01)

(58) Field of Classification Search
CPC ...... G06T 5/90–94; G06T 2207/20208; H04N 23/741; H04N 23/71; H04N 1/6027;
(Continued)

(56) References Cited

U.S. PATENT DOCUMENTS

| 8,811,490 B2 | 8/2014 | Su |
| 2017/0330529 A1 | 11/2017 | Van Mourik et al. |

(Continued)

FOREIGN PATENT DOCUMENTS

| CN | 105405107 A | 3/2016 |
| CN | 108431886 A | 8/2018 |

(Continued)

OTHER PUBLICATIONS

ITU REC.ITU-R BT. 1886 "Reference Electro-Optical Transfer Function for Flat Panel Displays Used in HDTV Studio Production" Mar. 2011.

(Continued)

*Primary Examiner* — Raphael Schwartz

(57) ABSTRACT

Backward reshaping metadata prediction models are trained with training SDR images and corresponding training HDR images. Content creation user input to define user adjusted HDR appearances for the corresponding training HDR images is received. Content-creation-user-specific modified backward reshaping metadata prediction models are generated based on the trained prediction models and the content creation user input. The content-creation-user-specific modified prediction models are used to predict operational parameter values of content-creation-user-specific backward reshaping mappings for backward reshaping SDR images (Continued)

into mapped HDR images of at least one content-creation-user-adjusted HDR appearance.

14 Claims, 8 Drawing Sheets

(58) Field of Classification Search
CPC ........ H04N 9/68; H04N 23/70; H04N 19/186; H04N 5/202; H04N 19/98; H04N 5/57; H04N 1/60; G09G 2360/16; G09G 5/10; G09G 2320/0271; G09G 2320/066; G09G 2340/06; G09G 2320/0673; G09G 5/02; G09G 2320/0626; G09G 2320/0276; G09G 2320/0666

See application file for complete search history.

(56) References Cited

U.S. PATENT DOCUMENTS

| | | |
|---|---|---|
| 2018/0020224 A1 | 1/2018 | Su |
| 2018/0115777 A1* | 4/2018 | Piramanayagam ....... G06T 7/00 |
| 2018/0350047 A1 | 12/2018 | Baar |
| 2021/0195221 A1 | 6/2021 | Song |
| 2022/0058783 A1 | 2/2022 | Kadu |

FOREIGN PATENT DOCUMENTS

| | | |
|---|---|---|
| CN | 107105223 B | 12/2018 |
| WO | 2018231968 A1 | 12/2018 |
| WO | 2020131731 A1 | 6/2020 |

OTHER PUBLICATIONS

ITU-R BT.2100-0, "Image Parameter Values for High Dynamic Range Television for Use in Production and International Programme Exchange" Jul. 2016.

Luzardo Gonzalo et al: "Fully-Automatic Inverse Tone Mapping Preserving the Content Creator's Artistic Intentions", 2018 Picture Coding Symposium (PCS), IEEE, Jun. 24, 2018 (Jun. 24, 2018), pp. 199-203.

SMPTE ST 2084:2014 "High Dynamic Range EOTF of Mastering Reference Displays".

Du Junpei, Interpolation, Enhamcement and Reconstruction of Transcale Motion Images, Pub No. 225, Apr. 30, 2019, 3 pages, Beijing, Beijing university publisher.

Huo Guan Ying et al., Side-Scan Sonal Image Target Segmentation, Apr. 30, 2017, pp. 24-25, 2 pages, Engineering University Press, Harbin, CN.

* cited by examiner

```
┌─────────────────────────────────────────────┐
│  access a model template comprising backward │
│  reshaping metadata prediction models  402   │
└─────────────────────────────────────────────┘
                      │
┌─────────────────────────────────────────────┐
│  receive content creation user input that    │
│  defines user-adjusted HDR appearances  404  │
└─────────────────────────────────────────────┘
                      │
┌─────────────────────────────────────────────┐
│  generate, based on the model template and   │
│  the content creation user input, user-      │
│  specific modified prediction models  406    │
└─────────────────────────────────────────────┘
                      │
┌─────────────────────────────────────────────┐
│  use the user-specific modified prediction   │
│  models to predict operational parameter     │
│  values of user-specific backward reshaping  │
│  mappings  408                               │
└─────────────────────────────────────────────┘
```

*FIG. 4A*

EFFICIENT USER-DEFINED SDR-TO-HDR CONVERSION WITH MODEL TEMPLATES

CROSS-REFERENCE TO RELATED APPLICATIONS

This application claims priority to United States Provisional Patent Application No. 62/887,123, filed Aug. 15, 2019 and European Patent Application No. 19191921.6, filed Aug. 15, 2019, each of which is hereby incorporated by reference in its entirety.

TECHNOLOGY

The present disclosure relates generally to images. More particularly, an embodiment of the present disclosure relates to user-defined SDR-to-HDR conversion with model templates.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m² or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "Image parameter values for high dynamic range television for use in production and international programme exchange," (June 2017). As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1:
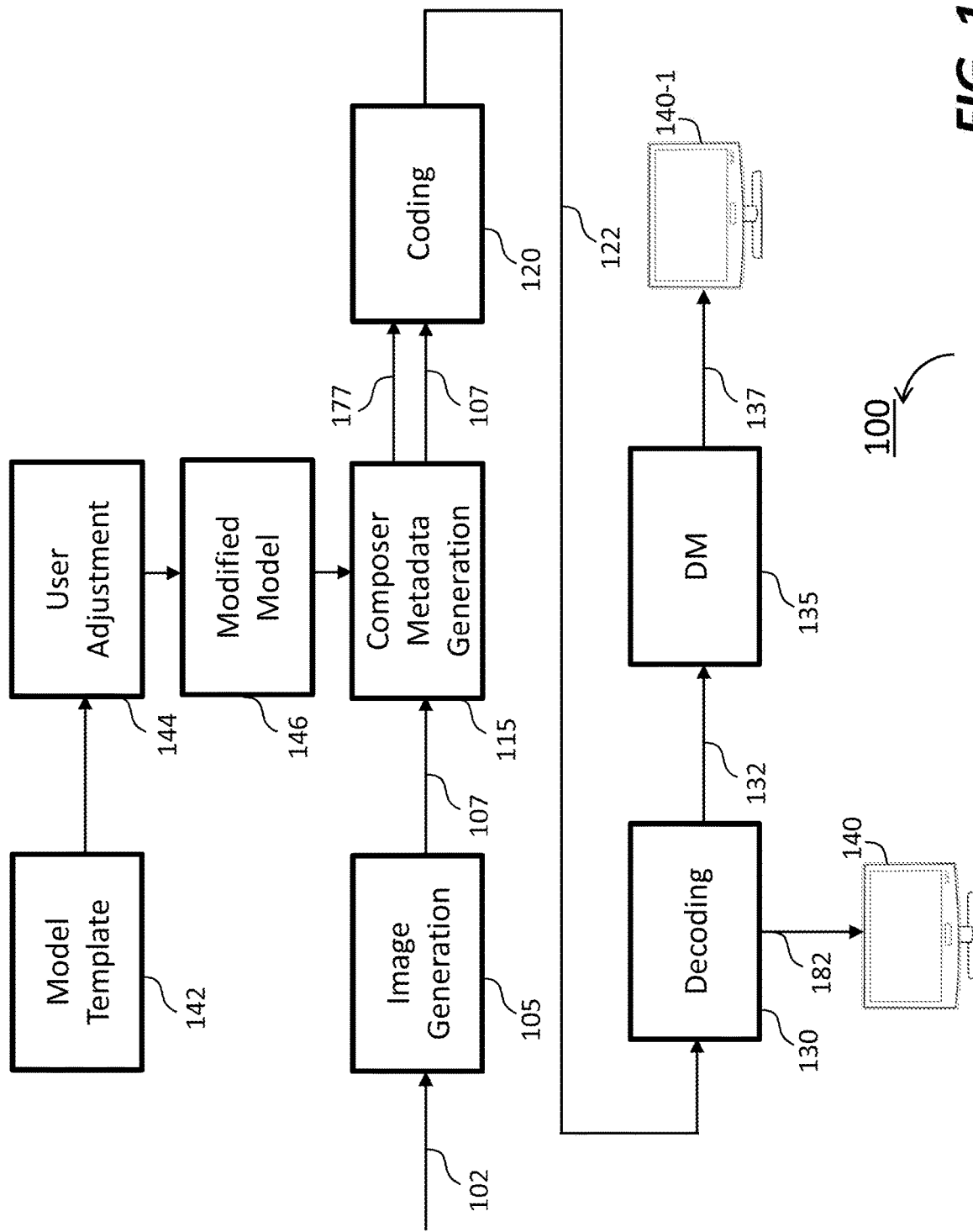
FIG. 1 depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

Efficient user-defined SDR-to-HDR conversion with model templates is described herein. Techniques as described herein employ an efficient user-defined theme to generate user-defined composer metadata that enables a recipient device to generate user-defined mapped HDR images with a user-defined HDR look or appearance from the SDR images. The user-defined theme may be implemented on top of, or with a starting point of, a dynamic SDR+ model template. The model template comprises one or more machine-learning (ML) generated luma Gaussian Process Regression (GPR) models and one or more ML generated chroma dictionaries, which were previously trained with a training dataset.

Example embodiments described herein relate to image metadata generation/optimization through machine learning and user input. A model template comprising backward reshaping metadata prediction models is accessed. The backward reshaping metadata prediction models are trained with a plurality of training image feature vectors from a plurality of training standard dynamic range (SDR) images in a plurality of training image pairs and ground truth derived with a plurality of corresponding training high dynamic range (HDR) images in the plurality of training image pairs. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges. Content creation user input is received to define one or more content-creation-user-adjusted HDR appearances for the plurality of corresponding training HDR images. Content-creation-user-specific modified backward reshaping metadata prediction models are generated based on the model template and the content creation user input. The content-creation-user-specific modified backward reshaping metadata prediction models are used to predict operational parameter values of content-creation-user-specific backward reshaping mappings for backward reshaping SDR images into mapped HDR images of at least one of the one or more content-creation-user-adjusted HDR appearances.

Example embodiments described herein relate to image metadata generation/optimization through machine learning and user input. A standard dynamic range (SDR) image to be backward reshaped into a corresponding mapped high dynamic range (HDR) image is decoded from a video signal. Composer metadata that is used to derive one or more operational parameter values of content-user-specific backward reshaping mappings is decoded from the video signal. The one or more operational parameter values of content-user-specific backward reshaping mappings are predicted by one or more content-creation-user-specific modified backward reshaping metadata prediction models. The one or more content-creation-user-specific modified backward reshaping metadata prediction models are generated based on a model template and content creation user input. The model template includes backward reshaping metadata prediction models trained with a plurality of training image feature vectors from a plurality of training SDR images in a plurality of training image pairs and ground truth derived with a plurality of corresponding training HDR images in the plurality of training image pairs. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges. Content creation user input modifies the plurality of corresponding training HDR images into one or more content-creation-user-adjusted HDR appearances. The one or more operational parameter values of the content-user-specific backward reshaping mappings are used to backward reshape the SDR image into the mapped HDR image of at least one of the one or more content-creation-user-adjusted HDR appearances. A display image derived from the mapped HDR image is caused to be rendered with a display device.

Example Video Delivery Processing Pipeline

FIG. 1 depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, headmounted display devices, wearable display devices, etc.

Video frames (102) are captured or generated using image generation block (105). Video frames (102) may be digitally captured (e.g. by a digital camera) or generated by a computer (e.g. using computer animation, etc.) to provide video data (107). Additionally, optionally or alternatively, video frames (102) may be captured on film by a film camera. The film is converted to a digital format to provide the video data (107). In some embodiments, the video data (107) may be (e.g., automatically with no human input, manually, automatically with human input, etc.) edited or transformed into a sequence of images before being passed to the next processing stage/phase in the video delivery pipeline (100).

The video data (107) may include SDR contents (e.g., SDR+ contents, etc.) as well as image metadata that may be used by recipient devices downstream in the video delivery pipeline (100) to perform image processing operations on a decoded version of the SDR video contents. Example SDR video contents may, but are not necessarily limited to only, be SDR+ video contents, SDR images, SDR movie releases, SDR+ images, SDR media programs, etc.

As used herein, the term "SDR+" denotes a combination of SDR image data and metadata, which when combined together allow generating corresponding high dynamic range (HDR) image data. SDR+ image metadata may include composer data (e.g., user adjusted from a model template, etc.) to generate backward reshaping mappings (e.g., a backward reshaping function/curve or polynomial set, multivariate multiple regression (MMR) coefficients, etc.) which when applied to an input SDR image generate a corresponding HDR image of a user-defined HDR look or appearance. SDR+ images allow backwards compatibility with legacy SDR displays which can ignore the SDR+ image metadata and simply display the SDR image.

Image metadata transmitted with SDR video contents to a recipient device may include composer metadata generated (e.g., automatically, in real time, in offline processing, etc.) under techniques described herein. In some embodiments, the video data (107) is provided to a processor for composer metadata generation (115). The composer metadata generation (115) may automatically generate composer metadata with no or little human interaction. The automatically generated composer metadata can be used by recipient device(s) to perform backward reshaping operations for generating corresponding high dynamic range (HDR) images from SDR images in the video data (107).

The composer metadata generation (115) can be used to provide one or more valuable services for making video contents available to a wide variety of display devices. One of the valuable services provided by the composer metadata generation (115) is to generate the HDR images from the SDR images as mentioned above, in operational scenarios in which HDR images for video content depicted in the SDR images are not available but the SDR images depicting the video content are available. Thus, techniques as described herein can be used to generate or compose HDR video content for HDR displays, in these operational scenarios in which the SDR images are available.

Another valuable service provided by the composer metadata generation (115) is to generate HDR video content optimized for HDR displays (e.g., entirely, partially, etc.) without relying on some or all of a colorist's manual operations known as "color timing" or "color grading."

In some operational scenarios, a coding block (120) receives the video data (107), the automatically generated composer metadata (177), and other image metadata; and encodes the video data (107) with the automatically generated composer metadata (177), the other image metadata, etc., into a coded bitstream (122). Example coded bitstreams may include, but are not necessarily limited to, a single layer video signal, etc. In some embodiments, the coding block (120) may comprise audio and video encoders, such as those defined by ATSC, DVB, DVD, Blu-Ray, and other delivery formats, to generate the coded bitstream (122).

The coded bitstream (122) is then delivered downstream to receivers such as decoding and playback devices, media source devices, media streaming client devices, television sets (e.g., smart TVs, etc.), set-top boxes, movie theaters, and the like. In a downstream device, the coded bitstream (122) is decoded by decoding block (130) to generate decoded images 182, which may be similar to or the same as the images (e.g., SDR images, HDR images, etc.) represented in the video data (107) subject to quantization errors generated in compression performed by the coding block (120) and decompression performed by the decoding block (130).

In a non-limiting example, the video signal represented in the coded bitstream (122) may be a backward compatible SDR video signal (e.g., an SDR+ video signal, etc.). Here, a "backward compatible video signal" refers to a video signal that carries SDR images optimized (e.g., with specific artistic intent preserved, etc.) for SDR displays.

In some embodiments, the coded bitstream (122) outputted by the coding block (120) may represent an output SDR video signal (e.g., an SDR+ video signal, etc.) embedded with image metadata including but not limited to inverse tone mapping metadata, the automatically generated composer metadata (177), display management (DM) metadata, etc. The automatically generated composer metadata (177) specifies backward reshaping mappings that can be used by the downstream decoders to perform backward reshaping on SDR images (e.g., SDR+ images, etc.) decoded from the coded bitstream (122) in order to generate backward reshaped images for rendering on an HDR (e.g., target, reference, etc.) display. In some embodiments, the backward reshaped images may be generated from the decoded SDR images using one or more SDR-to-HDR conversion tools implementing the backward reshaping mappings (or inverse tone mappings) as specified in the automatically generated composer metadata (177).

As used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224), and PCT Application Ser. No. PCT/US2019/031620, filed on May 9, 2019, their entire contents of which are hereby incorporated by reference as if fully set forth herein.

Additionally, optionally, or alternatively, the DM metadata in the image metadata can be used by the downstream decoders to perform display management operations on the backward reshaped images generate display images (e.g., HDR display images, etc.) optimized for rendering on the HDR reference display devices, or other display devices such as non-reference HDR display devices, etc.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata (e.g., user-adjusted from a model template, etc.) from (e.g., the metadata container in, etc.) the coded bitstream (122) and use the composer metadata to compose HDR images (132) of user-defined HDR look(s) or appearance(s), which may be backward reshaped images generated from backward reshaping the SDR images based on the composer metadata. In addition, the receiver can extract the DM metadata from the coded bitstream (122) and apply DM operations (135) on the HDR images (132) based on the DM metadata to generate display images (137) optimized for rendering on the HDR (e.g., non-reference, etc.) display device (140-1) and render the display images (137) on the HDR display device (140-1).

Model Templates, User Adjustments and Modified Templates

Single Layer Inverse Display Management (SLiDM) or SDR+ can be used to enhance SDR content for rendering on HDR display devices. Luma and chroma channels (or color space components) of SDR images may be mapped separately using image metadata such as composer metadata to generate corresponding luma and chroma channels of (mapped) HDR images.

Techniques as described herein employ an efficient user-defined theme to generate user-defined composer metadata that enables a recipient device to generate user-defined mapped HDR images with a user-defined HDR look or appearance from the SDR images. The user-defined theme may be implemented on top of, or with a starting point of, a dynamic SDR+ model template such as 142 of FIG. 1. The model template (142) comprises one or more machine-learning (ML) generated luma Gaussian Process Regression (GPR) models and one or more ML generated chroma dictionaries, which were previously trained with a training dataset. Example ML generation of luma GPR models and chroma dictionaries are described in U.S. Provisional Patent Application Ser. No. 62/781,185, filed on Dec. 18, 2018, the entire contents of which are hereby incorporated by reference as if fully set forth herein.

The training dataset comprises (training image) pairs of a plurality of training SDR images and a plurality of corresponding training HDR images. Each (training image) pair as described herein comprises a training SDR image in the plurality of training SDR images and a corresponding HDR image in the plurality of corresponding training HDR images. The corresponding HDR image may be an HDR image derived from the SDR image in the same pair through professional color grading, manual color grading, etc.

Training image features (e.g., content dependent features, pixel value dependent features, etc.) are extracted from the plurality of training SDR images. These image features are used to train the ML generated luma GPR models and the ML generated chroma dictionaries to be included in the model template (142) accessible to content creation users. Machine learnt optimal operational parameters for the ML prediction models/algorithms/methods the ML generated luma GPR models and the ML generated chroma dictionaries in the model template (142), as trained with the training image features, can be stored persistently, in cache/memory, in one or more cloud-based servers, etc., and made available (e.g., through web portals, etc.) to content creation users who wish to create relatively high quality (e.g., professional quality, near professional quality, non-training, etc.) HDR images of respective user-defined looks or appearances from (e.g., non-training, user-owned, user-sourced, etc.) SDR images.

More specifically, a content creation user (e.g., a fee-paying user, a subscriber, an authorized user, a designated user, under a valid license, etc.) is allowed to access and modify (e.g., a copy of, etc.) the previously machine trained model template (142) with user adjustment(s) 144 to generate a user-defined theme (e.g., a user-defined HDR look or appearance, etc.) for SDR-to-HDR conversion as represented by a modified template 146 of FIG. 1. The modified template (146) comprises one or more user-updated luma GPR models and one or more user-updated chroma dictionary that may be used to generate the composing metadata for backward reshaping the SDR images into the HDR images in accordance with the user-defined theme for SDR-to-HDR conversion.

The user adjustments (144) may be determined based on user input made by the content creation user through one or more user interfaces presented by a system as described herein to the user. In some operational scenarios, to create the modified template (146), an intuitive solution is to keep all of the training SDR images unchanged and allow the user to adjust the (HDR) look or appearance of the training HDR images corresponding to the training SDR images. The training HDR images as adjusted by the user in combination with the unchanged training SDR images can then be used as a new training dataset to generate the user-updated luma GPR models and chroma dictionaries. However, adjusting all training HDR images within a training dataset that comprises a relatively large population of training images would be a very time consuming task for most end users who may be amateurs and/or lack experience/education in color grading. Furthermore, re-training all parameters from the new training dataset comprising the modified training HDR images would also consume a relatively large amount of computation power.

Under techniques as described herein, the modified template (146) can be derived in a relatively simple and efficient manner End users (e.g., content creation users, etc.) are allowed to perform (e.g., only, etc.) relatively minimal amounts of user interactions or operations yet achieve relatively maximal amounts of appearance adjustments in accordance with these end users' creative intents.

These techniques can be used to compute model parameters in the modified template (146) to effectuate user-defined HDR appearance in a relatively easy, simple and efficient way. The computation of the model parameters can be based on the user adjustments (144) that specify user-defined preferences on visual characteristics such as brightness, saturation, and hue, in HDR images.

Luma and chroma user adjustments may be handled differently. In some operational scenarios, for luma, a simple least squared solution may be formulated or computed to generate user-updated GPR models, thereby avoiding re-running the entire machine learning algorithm with user-updated training HDR images. For chroma, a combined set of input training features in vector or matrix forms, as computed from all image clusters in the training dataset, may be used to generate user-updated chroma dictionaries through simple matrix multiplications, avoiding performing full complex numerical optimization. In some operational scenarios, an image cluster as described herein may be generated based on automatic clustering algorithm(s) using like (e.g., SDR, etc.) image features and/or characteristics and/or subjects and/or events, etc.

The user may adjust the desired HDR look in a global setting or a local setting. The global setting may be applied (e.g., universally, etc.) to all GPR models and/or chroma dictionaries for all image clusters. The local setting may be (e.g., differentially, etc.) applied to different image clusters to cause different user-adjustment-based modifications for the different image clusters.

Luma GPR Model Adjustment and Re-Training

Gaussian Process Regression (GPR) may be used to derive optimized operational parameters of ML generated luma GPR models. The GPR models—representing a part of the model template (142)—may be trained (e.g., previously, in advance, etc.) with a training dataset as described herein. The trained ML generated luma GPR model (for simplicity the pre-trained GPR models) can then be re-used to compute new GPR parameters based on a modified desired HDR appearance derived from user input.

Denote image features extracted from the j-th training SDR image (or frame) in a plurality of training SDR images in a training dataset as a feature (e.g., columnar, etc.) vector $x_j$. A feature matrix X may be formed by a plurality of feature vectors comprising image features of the plurality of training SDR images.

Denote a corresponding target value (e.g., a target HDR codeword value to be mapped or backward reshaped from a specific SDR codeword in a backward reshaping curve, etc.) to be estimated or predicted by a GPR model based on the j-th feature vector $x_j$ as $y_j$. A target vector y can be formed by a plurality of target values to be estimated or predicted by the GPR model based on the plurality of feature vectors comprising image features extracted from the plurality of training SDR images.

The feature matrix X or feature vectors therein serve as input in a GPR process implementing Gaussian processes regression to derive optimized operational parameters for the GPR model, whereas the target vector y or target values therein serve as responses (e.g., targets, references, etc.) in the same GPR process.

Gaussian Process (GP) employed in the GPR process is a collection of random variables, any finite number of which have a joint Gaussian distribution. GP is completely specified by its mean function denoted as m(x) and covariance function denoted as r(x, x'). The mean function m(x) and the covariance function r(x, x') of a real process f(x) are respectively defined as follows:

$$m(x) = E[f(x)] \quad (1\text{-}1)$$

$$r(x,x') = E[(f(x)-m(x))(f(x')-m(x'))] \quad (1\text{-}2)$$

The GP can be expressed or represented as follows:

$$f(x) \sim GP(m(x), r(x,x')) \quad (2)$$

where "~" indicates that the real process f(x) is a distribution according to the GP as characterized by the GP's mean function denoted as m(x) and covariance function denoted as r(x,x').

Let $f_p = f(x_p)$ be a random variable corresponding to the case $(x_p, y_p)$ as would be expected, where $x_p$ denotes the p-th feature vector comprising image features extracted from the p-th training SDR image and $y_p$ denotes the p-th target value to be estimated or predicted by the given GPR model.

Under the consistency/marginalization requirement in GP, if $(y_1, y_2) \sim N(\mu, \Sigma)$ then $(y_1) \sim N(\mu_1, \Sigma_{11})$, where $\Sigma_{11}$ is the relevant submatrix of $\Sigma$. In other words, examination of a larger set of variables does not change or alter the distribution of a smaller set of variables (e.g., in the larger set of variables, etc.).

The GPR process may be built based on a selected covariance function (or kernel), $r(\hat{x}, x_q)$. Example covariance functions may include, but are not necessarily limited to only, a rational quadratic (RQ) function as follows:

$$r(x_p, x_q) = \sigma_f^2 \left(1 + \frac{\sum_{k=0}^{K-1}(x_{p,k}-x_{q,k})^2}{2\alpha d^2}\right)^{-\alpha} \quad (3)$$

Hyperparameter $(\sigma_f, \alpha, l)$ in the RQ function above can be found via a GPR optimization procedure as follows.

A covariance matrix is constructed based on the RQ function as follows:

$$R(X, X) = \begin{bmatrix} r(x_0, x_0) & r(x_0, x_1) & \cdots & r(x_0, x_{F-1}) \\ r(x_1, x_0) & r(x_1, x_1) & \cdots & r(x_{11}, x_{F-1}) \\ \vdots & \vdots & & \vdots \\ r(x_{F-1}, x_0) & r(x_{F-1}, x_1) & \cdots & r(x_{F-1}, x_{F-1}) \end{bmatrix} \quad (4)$$

For the noise free data case, $\{(x_p, f_p) | p=1, \ldots, F\}$, where F is represents the total number of images in the plurality of training SDR images, the joint distribution of training outputs (denoted as f) in connection with the training dataset and test outputs (denoted as f*) in connection with a given test dataset may be represented as follows:

$$\begin{bmatrix} f \\ f_* \end{bmatrix} \sim N\left(0, \begin{bmatrix} R(X,X) & R(X,X_*) \\ R(X_*,X) & R(X_*,X_*) \end{bmatrix}\right) \quad (5)$$

The joint Gaussian prior distribution on observations or outputs in connection with the given test data may be represented as follows:

$$f_*|X_*,X,f \sim N(R(X_*,X)R(X,X)^{-1}f, R(X_*,X_*)-R(X_*,X)R(X,X)^{-1}R(X,X_*)) \quad (6)$$

For the noisy data case with noise $\sigma_n^2$, the joint distribution of training outputs (denoted as y) in connection with the training dataset and test outputs f* in connection with the given test dataset may be represented as follows:

$$\begin{bmatrix} y \\ f_* \end{bmatrix} \sim N\left(0, \begin{bmatrix} R(X,X)+\sigma_n^2 I & R(X,X_*) \\ R(X_*,X) & R(X_*,X_*) \end{bmatrix}\right) \quad (7)$$

The predictive output values from the GPR process may be given as follows:

$$f_*|X_*,X,y \sim N(\bar{f}_*, \text{cov}(f_*)) \quad (8)$$

where $$\bar{f}_* = R(X_*,X)[R(X,X)+\sigma_n^2 I]^{-1} y \quad (9)$$

$$\text{cov}(f_*) = R(X_*,X_*) - R(X_*,X)[R(X,X)+\sigma_n^2 I]^{-1} R(X,X_*) \quad (10)$$

The prediction vector, $\bar{f}_*$, in expression (9) above can be computed relatively efficiently as follows:

$$L = \text{cholesky}(R(X,X)+\sigma_n^2 I) \quad (11)$$

$$w = L^T \backslash (L \backslash y) \quad (12)$$

$$\bar{f}_* = R(X_*,X)^T w \quad (13)$$

where cholesky( . . . ) indicates a Cholesky decomposition of a parenthetically enclosed matrix in ( . . . ); and the operator "\" denotes a left matrix divide operation.

In practice, for the noisy data case, the covariance matrix in expression (4) above can be directly computed based on collected data (e.g., with no estimation of $\sigma_n^2$, etc.) from the training dataset.

Denote the q-th element in w as $w_q$. Given a new input (e.g., non-training, test, etc.) SDR image with extracted image features represented by a feature vector, $\hat{x}$, the predicted value ($\hat{y}$) from the GPR model for the new input SDR image may be given as follows:

$$\hat{y} = \sum_{q=0}^{F-1} w_q \cdot r(\hat{x}, x_q) \quad (14)$$

The GPR model may be characterized by some or all of the following parameters:

Hyperparameter $\theta=\{\sigma_f, \alpha, 1\}$ for the kernel $\{x_q\}$: feature vectors (F vectors and each has K dimension)

$\{w_q\}$: weighting factors (F factors)

Hyperparameter $(\sigma_f, \alpha, 1)$ represents some or all determinant parameters for the performance of the GPR model. Optimized operational values for Hyperparameter $(\sigma_f, \alpha, 1)$ may be obtained or solved by maximizing the logarithm of a marginal likelihood as follows:

$$p(y|X) = \int p(y|f, X) p(f|X) df \quad (15)$$

For the noise free data case, the logarithm of the the marginal likelihood may be given as follows:

$$\log p(f|X) = -\frac{1}{2} f^T R(X, X)^{-1} f - \frac{1}{2} \log|R(X, X)| - \frac{n}{2} \log 2\pi \quad (16)$$

For the noisy data case, the logarithm of the the marginal likelihood may be given as follows:

$$\log p(y|X) = -\frac{1}{2} y^T (R(X, X) + \sigma_n^2 I)^{-1} y - \frac{1}{2} \log|R(X, X)| - \frac{n}{2} \log 2\pi \quad (17)$$

Example optimal solution(s) or optimized value(s) for each hyperparameter can be obtained via solving partial derivatives of the marginal likelihood(s) as follows:

$$\frac{\partial}{\partial \theta_j} \log p(y|X, \theta) = -\frac{1}{2} y^T R(X, X)^{-1} \frac{\partial R(X, X)}{\partial \theta_j} R(X, X)^{-1} y - \frac{1}{2} tr\left(R(X, X)^{-1} \frac{\partial R(X, X)}{\partial \theta_j}\right) \quad (18)$$

$$= \frac{1}{2} tr\left((\alpha \alpha^T - R(X, X)^{-1}) \frac{\partial R(X, X)}{\partial \theta_j}\right)$$

Re-Training with Updated Target Values

A model template (e.g., 142 of FIG. 1, etc.) as described herein may comprise a plurality of ML generated luma GPR models used to predict or generate a luma backward reshaping curve (e.g., a luma backward reshaping function, a backward reshaping lookup table or BLUT, etc.). Each ML generated luma GPR model in the plurality of ML generated luma GPR models may operate with optimized operational values generated from a training dataset as described herein using the foregoing operations represented by expressions (1) through (18) above. Each such ML generated luma GPR model may be used to predict or estimate an HDR mapped codeword (or value) mapped from a corresponding SDR codeword (or value) in a plurality of SDR codewords in an SDR codeword space. HDR mapped codewords as predicted or estimated by the plurality of ML generated luma GPR models and their corresponding SDR codewords may be used to construct the luma back reshaping curve. Example generation of luma backward reshaping function based on ML generated luma GPR models is also described in the previously mentioned U.S. Provisional Patent Application Ser. No. 62/781,185.

A user-defined theme (e.g., corresponding to a specific user-adjusted HDR look or appearance, etc.) may be generated based on user adjustments (e.g., 144 of FIG. 1, etc.) made on the model template (142). In the user-defined theme, the training SDR images in the training dataset still stay the same. Thus, the input feature matrix X (or $\{x_q\}$ feature vectors therein) still stay the same. However, the desired target value y (e.g., a target HDR codeword to be backward reshaped from a given SDR codeword in a backward reshaping function, etc.) is changed to $\tilde{y}$ in accordance with the user adjustments (144) made (or deemed to be made) on training HDR images in the training dataset corresponding to the training SDR images in the same training dataset.

Given the training SDR images unchanged under the user adjustments (144) and the corresponding HDR images now changed (or deemed to be changed) under the user adjustments (144), some or all of the following GPR operational parameters such as hyperparameter $\theta=\{\sigma_f, \alpha, 1\}$ for the kernel and $\{w_q\}$: weighting factors (F factors) may be re-computed to reflect the changes in the HDR images.

In some operational scenarios, all of the above GPR operational parameters may be straightforwardly recomputed or directly re-trained by re-running the GPR process as previously described based on a new training dataset comprising the unchanged training SDR images and the changed training HDR images. However, as previously noted, the training procedure as represented in the full-blown GPR process would take a relatively long time to complete and would also consume a significant amount of computational and other resources.

In some operational scenarios, a faster, more efficient solution or process may be used to update the GPR operational parameters by keeping hyperparameter $\theta$ unchanged and only updating the weighting factors $\{w_q\}$.

Since the feature matrix X is unchanged, hyperparameter $\theta$ (or components $\sigma_f, \alpha, 1$ therein) remains the same. As a result, the covariance matrix R(X, X) also remains the same. In addition, the L matrix also remains the same as indicated in expression (11) above.

Then, new weighting factors $\tilde{w}$ corresponding to the user-defined theme can be obtained as a simple least squared solution as follows:

$$\tilde{w} = L^T \backslash (L \backslash \tilde{y}) \quad (19)$$

where $\tilde{y}$ denotes a new target value to be predicted or estimated by an updated GPR model with the updated weight factors $\tilde{w}$.

A predicted value by the updated GPR model for a new input (e.g., non-training, test, etc.) SDR image can be obtained by simply plugging in the new weighting factors as follows:

$$\tilde{f}_* = R(X_*, X)^T \tilde{w} \quad (20)$$

or $$\hat{y} = \sum_{q=0}^{F-1} \tilde{w}_q \cdot r(\hat{x}, x_q) \quad (21)$$

In other words, in some operational scenarios, instead of re-running the full-blown GPR (machine learning) process, only the weighting factors $\{w_q\}$ are updated with new response data in connection with the training HDR images as changed in the user-defined theme derived by performing the user adjustments (144) on the model template (142), thereby significantly reducing resource usages as well as time in generating a modified template (e.g., 146 of FIG. 1, etc.).

Dictionary-Chroma Adjustment and Re-Training

Multivariate multiple regression (MMR) may be used to derive optimized operational parameters of chroma dictionaries. Examples of MMR models can be found in U.S. Pat. No. 8,811,490, "Multiple color channel multiple regression predictor," which is incorporated herein by reference in its entirety. The chroma dictionaries—representing a part of the model template (142)—may be (e.g., previously, in advance, etc.) trained with a training dataset (e.g., the same training dataset used to train GPR models, etc.) as described herein. The trained chroma dictionaries (for simplicity the pre-trained chroma dictionaries) can then be re-used to compute new MMR operational parameters based on a modified desired HDR appearance derived from user input.

A plurality of training SDR images and a plurality of corresponding training HDR images may be partitioned into a plurality of image clusters by automatic clustering techniques based on image characteristics (e.g., luminance, colors, resolutions, etc.), feature recognitions, image related properties (e.g., subjects, times, events, etc.), etc. In some operational scenarios, the training SDR images and their corresponding training HDR images (with or without user adjustments) can be automatically clustered into the plurality of image clusters based on feature vectors extracted from the training SDR images. An image cluster (or a corresponding feature vector cluster) may be characterized by a cluster centroid representing a center-of-mass of feature vectors extracted from training SDR images in the image cluster. Example automatic clustering in connection with images in a training dataset is described in the previously mentioned U.S. Provisional Patent Application Ser. No. 62/781,185.

Let triplets $(s_{ji}^y, s_{ji}^{c0}, s_{ji}^{c1})$ and $(v_{ji}^y, v_{ji}^{c0}, v_{ji}^{c1})$, represent normalized Y, $C_0$ and $C_1$ values for the i-th pixel in the j-th training SDR image (or frame) and the j-th training HDR image (or frame), respectively.

Y, $C_0$ and $C_1$ codeword ranges in an SDR codeword space can be partitioned into $Q_y$, $Q_{C_0}$ and $Q_{C_1}$ SDR codeword bins, respectively. As a result, a three-dimensional (3D) table $\Omega_j^s$—having $Q_y \times Q_{C_0} \times Q_{C_1}$ bins or entries—is constructed for the j-th training SDR image. Each bin in this 3D table $\Omega_j^s$ stores a (3-element) vector comprising three vector components each of which is first initialized to zero. After all vectors in all bins (or all entries) of the 3D table are initialized to [0, 0, 0], each SDR pixel in the j-th training SDR image may be processed to determine a corresponding bin or bin index $t=(q_y, q_{c_0}, q_{c_1})$ to which this SDR pixel belongs or associated. More specifically, the bin association between each such SDR pixel and its corresponding bin or bin index can be found as follows:

$$q_y = \lfloor s_{ji}^y \times Q_y \rfloor \quad (22\text{-}1)$$

$$q_{c0} = \lfloor s_{ji}^{c0} \times Q_{c0} \rfloor \quad (22\text{-}2)$$

$$q_{c1} = \lfloor s_{ji}^{c1} \times Q_{c1} \rfloor \quad (22\text{-}3)$$

where $\lfloor \ldots \rfloor$ denotes a floor operator (that removes any fraction in a value enclosed by the floor operator).

It should be noted that a bin association of an SDR pixel as well as a bin association of an HDR pixel corresponding to the SDR pixel is governed by the SDR pixel only.

Once the bin association as indicated in expressions (22) above is determined, Y, $C_0$ and $C_1$ codeword values of the SDR pixel are added into respective vector components of the vector for that bin in the 3D table $\Omega_j^s(t)$. In other words, $\Omega_j^s(t)$ or vectors of bins therein accumulate Y, $C_0$ and $C_1$ codeword values—e.g., for all SDR pixels in the j-th training SDR image—that map to, or is associated with, the t-th bin, as follows:

$$\Omega_j^s(t) = \sum_{i \in t} \left[ s_{ji}^y \ s_{ji}^{c0} \ s_{ij}^{c1} \right] \quad (23)$$

for pixels in the j-th SDR frame for the t-th bin of the 3D table $\Omega_j^s(t)$.

Moreover, a 3D histogram $\Pi_j$ may be constructed for the j-th training SDR image, with each bin t in the 3D histogram $\Pi_j$ storing a total number of SDR pixels in the j-th SDR image that are mapped to the t-th bin, as follows:

$$\Pi_j(t) = \Sigma I(i \in t) \quad (24)$$

for pixels in j-th SDR frame, where $I(\bullet)$ in expression (24) above represents the identity function.

Similarly, a second 3D table $\Omega_j^v$ may be constructed in an HDR domain. The second 3D table $\Omega_j^v(t)$ (or bins/entries therein) aggregates Y, $C_0$ and $C_1$ codeword values—e.g., for all HDR pixels in the j-th training HDR image—such that collocated SDR pixels map to the t-th bin as follows:

$$\Omega_j^v(t) = \sum_{i \in t} \left[ v_{ji}^y \ v_{ji}^{c0} \ v_{ji}^{c1} \right] \quad (25)$$

for HDR pixels in the j-th training HDR frame for the $t^{th}$ bin.

For each image cluster c, let $\Phi_c$ be the set of training SDR and HDR images that map to, or is clustered into, the image cluster. Cluster specific 3D tables (e.g., $\Omega_c^s$ and $\Omega_c^v$) and a 3D histogram (e.g., $\Pi_c$, etc.) may be determined as follows:

$$\Omega_c^s(t) = \sum_{p \in \Phi_c} \Omega_p^s(t) \quad (26\text{-}1)$$

$$\Pi_c(t) = \sum_{p \in \Phi_c} \Pi_p(t) \quad (26\text{-}2)$$

$$\Omega_c^v(t) = \sum_{p \in \Phi_c} \Omega_p^v(t) \quad (26\text{-}3)$$

where p stands for the p-th SDR or HDR image belonging to this image cluster, or $p \in \Phi_c$.

The non-zero entries in the 3D tables $\Omega_c^s$ and $\Omega_c^v$ can be averaged out by dividing with a count (or the total number) of pixels in that bin as indicated by the 3D histogram $\Pi_c$. This normalizes vector components of (3-element) vectors in $\Omega_c^s(t)$ to be within a normalized value range [0,1]. The averaging operation may be represented as follows:

$$\Omega_c^s(t) = \Omega_c^s(t)/\Pi_c(t) \quad (27\text{-}1)$$

$$\Omega_c^v(t) = \Omega_c^v(t)/\Pi_c(t) \quad (27\text{-}2)$$

All mappings from $\Omega_c^s(t)$ to $\Omega_c^v(t)$ with the same bin index (as determined by the underlying SDR codeword values) may be used to construct a 3D mapping table (3DMT), which maps each bin in the 3D SDR table $\Omega_c^s(t)$ to a corresponding bin in the 3D HDR table $\Omega_c^v(t)$.

These 3D tables can be used to build mapping matrices $A_c$ and $B_c$ for the specific image cluster as follows.

Let $[s_{t,c}^y \; s_{t,c}^{c0} \; s_{t,c}^{c1}]$ be a 3D vector having averaged SDR codeword values in the $t^{th}$ bin of the 3D SDR table $\Omega_c^s$, where $s_{t,c}^y, s_{t,c}^{c0}, s_{t,c}^{c1} \in [0,1]$. Let $[v_{t,c}^y \; v_{t,c}^{c0} \; v_{t,c}^{c1}]$ be a second 3D vector having averaged HDR codeword values in the $t^{th}$ bin of the 3D HDR table $\Omega_c^v$, where $v_{t,c}^y, v_{t,c}^{c0}, v_{t,c}^{c1} \in [0,1]$. To predict the HDR chroma codeword values though MMR for the image cluster, the following vector (with R vector components) can be constructed for the t-th bin based on SDR image data for the t-th bin in training SDR images in the image cluster:

$$g_{t,c} = [1 \; s_{t,c}^y \; s_{t,c}^{c0} \; s_{t,c}^{c1} \; s_{t,c}^y \cdot s_{t,c}^{c0} \; s_{t,c}^y \cdot s_{t,c}^{c1} \; s_{t,c}^{c0} \cdot s_{t,c}^{c1} \; s_{t,c}^y \cdot s_{t,c}^{c0} \cdot s_{t,c}^{c1} \; (s_{t,c}^y)^2 \; (s_{t,c}^{c0})^2 \; (s_{t,c}^{c1})^2 \; (s_{t,c}^y \cdot s_{t,c}^{c0})^2 \; (s_{t,c}^y \cdot s_{t,c}^{c1})^2 \; (s_{t,c}^{c0} \cdot s_{t,c}^{c1})^2 \; (s_{t,c}^y \cdot s_{t,c}^{c0} \cdot s_{t,c}^{c1})^2] \quad (28)$$

Corresponding MMR coefficients $u_c^{c0}$ and $u_c^{c1}$ for the $C_0$ and $C_1$ channels in the HDR domain may be represented as follows:

$$u_c^{c0} = [u_{0,c}^{c0} u_{1,c}^{c0} \ldots u_{zr-1,c}^{c0}]^T \quad (29\text{-}1)$$

$$u_c^{c1} = [u_{0,c}^{c1} u_{1,c}^{c1} \ldots u_{R-1,c}^{c1}]^T \quad (29\text{-}2)$$

For an MMR procedure with second order MMR coefficients (e.g., R=15), expected (or predicted) HDR chroma values $\hat{v}_{t,c}^{c0}$ and $\hat{v}_{t,c}^{c1}$ can be obtained as follows:

$$\hat{v}_{t,c}^{c0} = g_{t,c} \cdot u_c^{c0} \quad (30\text{-}1)$$

$$\hat{v}_{t,c}^{c1} = g_{t,c} \cdot u_c^{c1} \quad (30\text{-}2)$$

Let $W_c$ be a count (or the total number) of non-zero bins in the 3D table $\Omega_c^s$. Vectors of expected HDR chroma values $\hat{v}_c^{c0}, \hat{v}_c^{c1}$, and a consolidated matrix of SDR values $G_c$ can be constructed as follows:

$$\hat{v}_c^{c0} = \begin{bmatrix} \hat{v}_{0,c}^{c0} \\ \hat{v}_{1,c}^{c0} \\ \vdots \\ \hat{v}_{W_c-1,c}^{c0} \end{bmatrix}, \hat{v}_c^{c1} = \begin{bmatrix} \hat{v}_{0,c}^{c1} \\ \hat{v}_{1,c}^{c1} \\ \vdots \\ \hat{v}_{W_c-1,c}^{c1} \end{bmatrix} \quad (31\text{-}1)$$

$$G_c = \begin{bmatrix} g_{0,c} \\ g_{1,c} \\ \vdots \\ g_{W_c-1,c} \end{bmatrix} \quad (31\text{-}2)$$

Similarly, vectors of ground truth HDR values $v_{c0}^c, v_c^{c0}$ as determined from HDR image data in the training HDR images of the cluster may be constructed as follows:

$$v_c^{c0} = \begin{bmatrix} v_{0,c}^{c0} \\ v_{1,c}^{c0} \\ \vdots \\ v_{W_c-1,c}^{c0} \end{bmatrix}, v_c^{c1} = \begin{bmatrix} v_{0,c}^{c1} \\ v_{1,c}^{c1} \\ \vdots \\ v_{W_c-1,c}^{cl} \end{bmatrix} \quad (32)$$

The expected (or predicted) HDR values can thus be obtained under the MMR procedure as follows:

$$\hat{v}_c^{c0} = G_c u_c^{c0} \quad (33\text{-}1)$$

$$\hat{v}_c^{c1} = G_c u_c^{c1} \quad (33\text{-}2)$$

Optimal values for the MMR coefficients $u_c^{c0}$ and $u_c^{c1}$ may be obtained or solved by formulating an optimization problem to minimize an overall approximation error for all bins, as follows:

For channel $c0$: $\min_{u_c^{c0}} \|v_c^{c0} - \hat{v}_c^{c0}\|^2 \quad (34\text{-}1)$ For channel $c1$: $\min_{u_c^{c1}} \|v_c^{c1} - \hat{v}_c^{c1}\|^2 \quad (34\text{-}2)$ This optimization problem can be solved with linear least squared solutions, as follows:

$$u_c^{c0,opt} = ((G_c)^T G_c)^{-1}((G_c)^T v_c^{c0}) \quad (35\text{-}1)$$

$$u_c^{c1,opt} = ((G_c)^T G_c)^{-1}((G^c)^T v_c^{c1}) \quad (35\text{-}2)$$

In expressions (35), let $A_c = G_c^T G_c$, $B_c^{c0} = G_c^T v_c^{c0}$, and $B_c^{c1} = G_c^T v_c^{c1}$. These mapping matrices $A_c$, $B_c^{c0}$, and $B_c^{c1}$ can be computed for each cluster separately and together with its cluster centroid forms a chroma dictionary for the cluster. As a result, chroma dictionaries for all clusters in the plurality of image clusters in the training dataset may comprise stores the following (e.g., core, main, used to derive all other quantities, etc.) components:

$A_c$ matrix for each cluster
$B_c^{c0}$ and $B_c^{c1}$ matrices for each cluster
Cluster centroid $\Psi_c(\bullet)$ for each cluster
Total of clusters C Re-Training with Updated Target Values A model template (e.g., 142 of FIG. 1, etc.) as described herein may comprise a plurality of ML generated chroma dictionaries for a plurality of image clusters with their respective cluster centroids comprising a population of image pairs of training SDR images and corresponding training HDR images. The ML generated chroma dictionaries can be used to predict or generate HDR chroma codewords of mapped or backward reshaped HDR images from SDR luma and chroma codewords of input SDR images. Each ML generated chroma dictionary in the plurality of ML generated chroma dictionaries for a corresponding image cluster in the plurality of image clusters may comprise optimized A and B matrices trained with training SDR images and training HDR images belonging to the corresponding image cluster using the foregoing operations represented by expressions (19) through (35) above. Example generation of chroma dictionaries is also described in the previously mentioned U.S. Provisional Patent Application Ser. No. 62/781,185.

A user-defined theme (e.g., corresponding to a specific user-adjusted HDR look or appearance, etc.) may be generated based on user adjustments (e.g., 144 of FIG. 1, etc.) made on the model template (142). In the user-defined theme, the training SDR images in the training dataset still stay the same. Thus, bins in the aforementioned 3D tables and histograms with values and pixel or codeword counts derived from SDR image data in the training SDR images do not change. For example, the 3D SDR table $\Omega_c^s$ (t) remain invariant with the user adjustments (144). In addition, the cluster centroids $\Psi_c(\bullet)$—which are automatically clustered using feature vectors extracted from the training SDR images—for all the image clusters remains the same. However, the 3D HDR table $\Omega_c^v$ (t) is modified as $\tilde{\Omega}_c^v(t)$ is populated with values collected or derived from (e.g., assumed, actual etc.) modified HDR codeword values $[\tilde{v}_{t,c}^y \; \tilde{v}_{t,c}^{c0} \; \tilde{v}_{t,c}^{c1}]$ or (e.g., directly, indirectly, etc.) from modified bin values dependent on (e.g., assumed, actual etc.) modified HDR images in accordance with the user-adjusted HDR appearance.

Corresponding MMR coefficients $\tilde{u}_c^{c0}$ and $\tilde{u}_c^{c1}$ for the $C_0$ and $C_1$ channels in the HDR domain after the user adjustments (144) may be represented as follows:

$$\tilde{u}_c^{c0} = [\tilde{u}_{0,c}^{c0} \tilde{u}_{1,c}^{c0} \ldots \tilde{u}_{R-1,c}^{c0}]^T \quad (36\text{-}1)$$

$$\tilde{u}_c^{c1} = [\tilde{u}_{0,c}^{c1} \tilde{u}_{1,c}^{c1} \ldots \tilde{u}_{R-1,c}^{c1}]^T \quad (36\text{-}2)$$

For an MMR procedure with second order MMR coefficients (e.g., R=15), expected (or predicted) HDR chroma values $\tilde{v}_{t,c}^{c0}$ and $\tilde{v}_{t,c}^{c1}$ after the user adjustments (144) can be obtained as follows:

$$\tilde{v}_{t,c}^{c0} = g_{t,c} \cdot \tilde{u}_c^{c0} \quad (37\text{-}1)$$

$$\tilde{v}_{t,c}^{c1} g_{t,c} \cdot \tilde{u}_c^{c1} \quad (37\text{-}2)$$

Note that $g_{t,c}$ and $G_c$ are unchanged since they are derived from the SDR image data. Expected (or predicted) HDR chroma values $\tilde{v}_c^{c0}$ and $\tilde{v}_c^{c1}$ in accordance with the user-adjusted HDR appearance after the user adjustments (144) may be represented as follows:

$$\tilde{v}_{t,c}^{c0} = v_c^{c0} + \Delta_c^{c0} \quad (38\text{-}1)$$

$$\tilde{v}_{t,c}^{c1} = v_c^{c1} + \Delta_c^{c1} \quad (38\text{-}2)$$

where $\Delta_c^{c0}$ and $\Delta_c^{c1}$ are the following modification vectors for each cluster $$\Delta_c^{c0} = \begin{bmatrix} g_{0,c}^{c0} \\ g_{1,c}^{c0} \\ \vdots \\ g_{W_c-1,c}^{c0} \end{bmatrix} \text{ and } \Delta_c^{c1} = \begin{bmatrix} g_{0,c}^{c1} \\ g_{1,c}^{c1} \\ \vdots \\ g_{W_c-1,c}^{c1} \end{bmatrix} \quad (39)$$

Similarly, vectors of ground truth HDR values $\tilde{v}_c^{c0}$, $\tilde{v}_c^{c1}$ as determined from HDR image data in the (e.g., actual, assumed, etc.) modified training HDR images of the cluster with the user-adjusted HDR appearance may be constructed as follows:

$$\hat{v}_c^{c0} = \begin{bmatrix} \hat{v}_{0,c}^{c0} \\ \hat{v}_{1,c}^{c0} \\ \vdots \\ \hat{v}_{W_c-1}^{c0} \end{bmatrix}, \hat{v}_c^{c1} = \begin{bmatrix} \hat{v}_{0,c}^{c1} \\ \hat{v}_{1,c}^{c1} \\ \vdots \\ \hat{v}_{W_c-1}^{c1} \end{bmatrix} \quad (40)$$

Optimal values for the MMR coefficients $\tilde{u}_c^{c0}$, $\tilde{u}_c^{c1}$ may be obtained or solved by formulating an optimization problem to minimize an overall approximation error for all bins, as follows:

$$\text{For channel } c0: \min_{\tilde{u}_c^{c0}} \| \hat{v}_c^{c0} - \hat{v}_c^{c0} \|^2 \quad (41\text{-}1)$$

$$\text{For channel } c1: \min_{\tilde{u}_c^{c1}} \| \hat{v}_c^{c1} - \hat{v}_c^{c1} \|^2 \quad (41\text{-}2)$$

This optimization problem can be solved with linear least squared solutions, as follows:

$$\tilde{u}_c^{c0,opt} = ((G_c)^T G_c)^{-1} ((G_c)^T \tilde{v}_c^{c0}) = D_c \tilde{v}_c^{c0} \quad (42\text{-}1)$$

$$\tilde{u}_c^{c1,opt} = ((G_c)^T G_c)^{-1} ((G_c)^T \tilde{v}_c^{c1}) = D_c \tilde{v}_c^{c1} \quad (42\text{-}2)$$

where $D_c = ((G_c)^T G_c)^{-1} (G)^T$.

For each cluster, the foregoing direct re-training/re-computing method may need to store 3D SDR tables $\Omega_c^s(t)$ in memory space or data store and derive $D_c$ from the stored 3D SDR tables $\Omega_c^s(t)$. Additionally, optionally or alternatively, the foregoing direct re-training/re-computing method may need to store $D_c$ directly for each cluster. The dimension of this data store for $D_c$ may be the total number of non-empty bins times the total number of non-empty bins, such as 10,000×10,000 per cluster, thereby amounting to a relatively large storage consumption. In addition, this direct re-training/re-computing method also may need to store 3D HDR tables $\Omega_c^v(t)$ per cluster so users can modify the 3D HDR tables $\Omega_c^v(t)$ into modified 3D HDR tables $\tilde{\Omega}_c^v(t)$.

In some operational scenarios, chroma dictionaries may be re-trained using a combined SDR set as follows. Instead of having an individual SDR set for each cluster, the combined SDR set for all image clusters can be obtained or generated by collecting SDR bin information for all training SDR images in all the image clusters. More specifically, the combined SDR set comprises (i) combined 3D SDR tables $\Omega^s(t)$ that accumulate Y, $C_0$ and $C_1$ values for all SDR pixels in all the training SDR images in the (e.g., entire, etc.) training dataset that map to all respective bins (e.g., the t-th bin, etc.) in the combined 3D SDR tables $\Omega^s(t)$ and (ii) a combined 3D histogram $\Pi(t)$ that accumulates pixel counts for all SDR pixels in all the training SDR images in the (e.g., entire, etc.) training dataset that map to all respective bins (e.g., the t-th bin, etc.) in the combined 3D histogram $\Pi(t)$, as follows:

$$\Omega^s(t) = \Sigma_j \Omega_j^s(t) \quad (43\text{-}1)$$

$$\Pi(t) = \Sigma_j \Sigma_{\forall i} l(i \in t) \quad (43\text{-}2)$$

Bin values in the combined 3D SDR tables $\Omega^s(t)$ may be normalized into a normalized value range [0, 1], as follows:

$$\Omega^s(t) = \Omega^s(t) / \Pi(t) \quad (44)$$

Let $[s_t^y \ s_t^{c0} \ s_t^{c1}]$ be a 3D averaged SDR vector in the $t^{th}$ bin of $\Omega^s(t)$. To predict or estimate HDR chroma codeword values, the following vector may be first constructed from the 3D averaged SDR vector $[s_t^y \ s_t^{c0} \ s_t^{c1}]$:

$$g_t = [1 \ s_t^y \ s_t^{c0} \ s_t^{c1} \ s_t^y \cdot s_t^{c0} \ s_t^y \cdot s_t^{c1} \ s_t^{c0} \cdot s_t^{c1} \ s_t^y \cdot s_t^{c0} \cdot s_t^{c1} (s_t^y)^2$$
$$(s_t^{c0})^2 (s_t^{c1})^2 (s_t^y \cdot s_t^{c0})^2 (s_t^y \cdot s_t^{c1})^2 (s_t^{c0} \cdot s_t^{c1})^2$$
$$(s_t^y \cdot s_t^{c0} \cdot s_t^{c1})^2] \quad (45)$$

Denote the total number of non-empty bins as W. A consolidated matrix of SDR values $G_c$ can be constructed from vectors of all bins (t=0, 1, (W−1)) in expression (45) above, as follows:

$$G = \begin{bmatrix} g_0 \\ g_1 \\ \vdots \\ g_{W-1} \end{bmatrix} \quad (46)$$

Note that the vector $g_t$ for all the clusters as indicated in expression (45) is different from $g_{t,c}$ for the c-th cluster as indicated in expression (28) as the vector $g_t$ is generated from combined SDR bins of all the clusters rather than from a specific cluster. As a result, the consolidated matrix G for all the clusters as indicated in expression (46) is also different from the consolidated matrix $G_c$ for a specific cluster as indicated in expression (31-2).

Under this combined SDR set approach, expected (or predicted) HDR values $v'^{c0}_c$ and $v'^{c1}_c$ in connection with the training HDR images in each cluster before the user adjust-ments (144) can thus be obtained based on the combined SDR set under the MMR procedure as follows:

$$v'^{c0}_c = G \cdot u_c^{c0,opt} \quad (47\text{-}1)$$

$$v'^{c1}_c = G \cdot u_c^{c1,opt} \quad (47\text{-}2)$$

Furthermore, expected (or predicted) HDR values $v''^{c0}_c$ and $v''^{c1}_c$ in connection with the (e.g., assumed, actual, etc.) modified training HDR images in each cluster after the user adjustments (144) in accordance with the user-adjusted HDR appearance can be represented, as follows:

$$v''^{c0}_c = v'^{c0}_c + \Delta'^{c0}_c \quad (48\text{-}1)$$

$$v''^{c1}_c = v'^{c1}_c + \Delta'^{c1}_c \quad (48\text{-}2)$$

where $\Delta'^{c0}_c$ and $\Delta'^{c1}_c$ are modification vectors for each cluster.

$$\Delta'^{c0}_c = \begin{bmatrix} g'^{c0}_{0,c} \\ g'^{c0}_{1,c} \\ \vdots \\ g'^{c0}_{W_c-1,c} \end{bmatrix} \text{ and } \Delta'^{c1}_c = \begin{bmatrix} g'^{c1}_{0,c} \\ g'^{c1}_{1,c} \\ \vdots \\ g'^{c1}_{W_c-1,c} \end{bmatrix} \quad (49)$$

Under this combined SDR set approach, MMR coefficients for each cluster may be obtained as follows:

$$u_c^{c0,mod} = ((G)^T G)^{-1} ((G)^T v''^{c0}_c) \quad (50\text{-}1)$$

$$u_c^{c0,mod} = ((G)^T G)^{-1} ((G)^T v''^{c1}_c) \quad (50\text{-}2)$$

As can be seen above, operations involved in computing $((G)^T G)^{-1} (G)^T$ in expressions (50) are identical for every cluster. Denote $D = ((G)^T G)^{-1} (G)^T$. Obtaining the MMR coefficients becomes simple matrix multiplications, as follows:

$$u_c^{c0,mod} = D \cdot v''^{c0}_c \quad (51\text{-}1)$$

$$u_c^{c1,mod} = D \cdot v''^{c1}_c \quad (51\text{-}2)$$

A video content creation/production supporting system such as a cloud based server that supports performing the re-training process with a user-operated video production system may store the following information as a part of the model template (142):

$\omega^s(t)$ (with dimension around ~1000×3 matrix)

$\{u_c^{c0,opt}, u_c^{c1,opt}\}$ for each cluster

At run time, the user-operated video production system, which a user uses to generate an SDR+ coded bitstream with a user-desired HDR appearance, may access the information of the model template (142) stored by the video content creation/production support system and use the accessed information to construct the following matrices initially, for example during the boot up time of the user-operated video production system, as follows:

G (from $\omega^s(t)$)

$$D = ((G)^T G)^{-1} (G)^T$$

$$\{v'^{c0}_c = G \cdot u_c^{c0,opt}, v'^{c1}_c = G \cdot u_c^{c1,opt}\}$$

For each cluster, the user-operated video production system can interact with the user through user interface(s) and generate modified vectors $\{\Delta'^{c0}_c, \Delta'^{c1}_c\}$ based on user input as provided by the user for each cluster in accordance with a user-desired HDR appearance. The modified vectors may be used to update the following vectors representing expected HDR codeword values in accordance with the user-desired HDR appearance, as indicated in expressions (48) above.

User-updated chroma dictionaries in accordance with the user-desired HDR appearance can be obtained to include a cluster-common matrix A and two cluster-specific matrices $B_c^{c0}$ and $B_c^{c1}$ for each cluster, as follows:

$$A = G^T G \quad (52\text{-}1)$$

$$B_c^{c0} = G^T \cdot v''^{c0}_c \quad (52\text{-}2)$$

$$B_c^{c1} = G^T \cdot v''^{c1}_c \quad (52\text{-}3)$$

Additionally, optionally or alternatively, the user-updated chroma dictionaries further include cluster centroids $\psi_c(\bullet)$ for each cluster and a total number of clusters C.

MMR coefficients can be computed as follows:

$$u_c^{c0,mod} = D \cdot v''^{c0}_c \quad (53\text{-}1)$$

$$u_c^{c1,mod} = D \cdot v''^{c1}_c \quad (53\text{-}2)$$

Global and Local Updates to Luma GPR Models

It should be noted that updating (or generating modified) luma GPR models as described herein may be through complete direct (or repeated) re-training with new references or new targets that are updated (or modified) training HDR images in accordance with user-defined HDR appearance(s). However, such re-training may take relatively longer time period to complete and consume a relatively large amount of computing and other resources.

As previously noted, techniques as described herein can be used to relatively efficiently obtain modified (or user-updated) luma GPR models to be included a modified template (e.g., 146 of FIG. 1, for generating composer metadata or backward reshaping metadata, etc.) in accordance with a user-updated HDR appearance that may be different from the (reference) HDR appearance in training HDR images in a training data set.

In some operational scenarios, the modified luma GPR models in the modified template (146) to be used to generate the composer metadata in accordance with the user-updated HDR appearance can be obtained based on global changes that the user makes to affect all of the training HDR images in the training dataset or and local case. In some operational scenarios, the modified luma GPR models in the modified template (146) to be used to generate the composer metadata in accordance with the user-updated HDR appearance can be obtained based on local or individual changes that the user makes to different subsets in all of the training HDR images in the training dataset or and local case. Additionally, optionally, or alternatively, in some operational scenarios, a combination of global and/or local changes to luma GPR models may be implemented.

Global Adjustments

As a starting point, L ML generated luma GPR models, where L is an integer greater than one (1). may be used to derive a (e.g., reference, etc.) ML generated luma backward reshaping curve (e.g., BLUT, a polynomial set, etc.) that is applicable to backward reshaping all training SDR images in a training dataset to mapped HDR images approximating all corresponding training HDR images in the training dataset. In the model template training phase, the training HDR images may be, but are not necessarily limited to only, professionally color graded to serve as references, targets and/or a starting point from which users can make their respective user-adjusted HDR appearances. User may be allowed to access and modify ML-generated luma GPR models used to generate the ML generated luma backward reshaping curve and to generate modified luma backward reshaping curve(s) based on the modified luma GPR models.

Figure 2A:
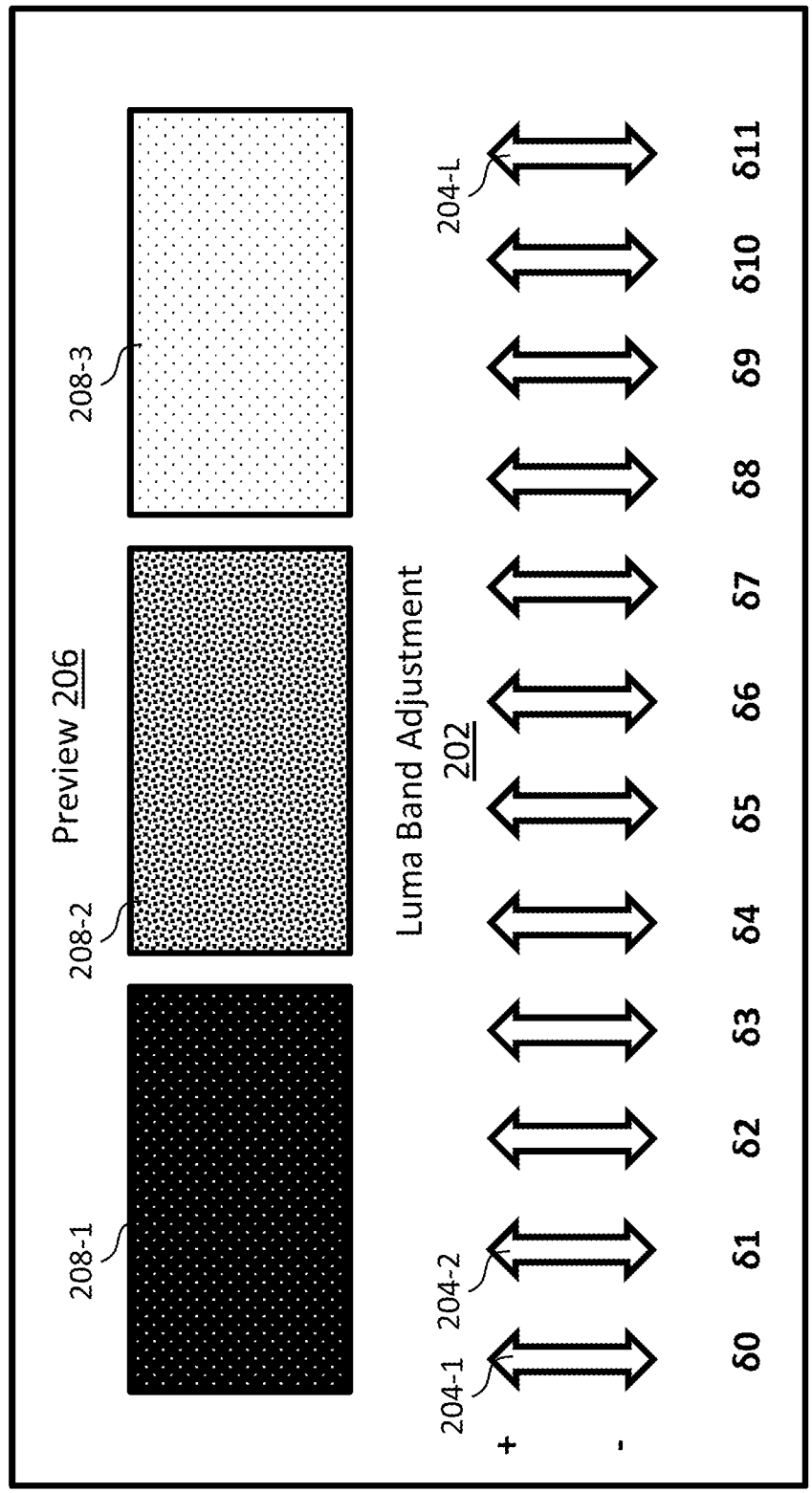
FIG. 2A and FIG. 2B illustrates example graphic user interface (GUI) displays for making global and local modifications of Gaussian process regression (GPR) models for luma prediction.

FIG. 2A illustrates an example graphic user interface (GUI) display (e.g., a web page, etc.)) of a system (e.g., a cloud-based web portal serving the web page, etc.) that interacts with a user to perform some or all user adjustments (e.g., 144 of FIG. 1, etc.) that update the L ML generated luma GPR models into L modified (or user adjusted) luma GPR models in accordance with a user-adjusted HDR appearance.

A user-desired global HDR luma appearance may be implemented by adjusting the L ML generated luma GPR models into the L modified (or user adjusted) luma GPR models, repeatedly, iteratively, progressively, etc., until all the user adjustments (144) to the L ML generated luma GPR models are finalized and/or saved by the user. The L modified (or user adjusted) luma GPR models can be used to generate a modified (or user-adjusted) backward shaping curve. The modified backward reshaping curve globally affects backward reshaping all the training SDR images into corresponding training HDR images as modified (or deemed to be modified) in accordance with the user-adjusted HDR appearance.

Each of the L (e.g., ML generated, user adjusted, etc.) GPR models controls a corresponding sample point in a plurality of different sample points on the backward reshaping curve (e.g., a tone curve, inverse tone mapping, etc.).

The GUI page of FIG. 2A comprises a luma band adjustment section 202 in which a plurality of user control components 204-1, 204-2, . . . 204-L in the form of a plurality of vertical slid bars is presented and can be operated through user input (e.g., clicking, key presses, touch screen actions, etc.) by the user to adjust a plurality of mapped HDR values in the plurality of sample points on the backward reshaping curve. Each vertical slide bar (e.g., 204-1, 204-2, . . . 204-L, etc.) in the plurality of vertical slide bars allows the user to control or adjust a respective mapped HDR value in the plurality of mapped HDR values in the plurality of sample points on the backward reshaping curve with a positive or negative (numeric value) increment (or an increase or a decrease of the mapped HDR value at a corresponding sample point) denoted as $\delta_i$, where i ranges from 0 to (L−1). The GUI page of FIG. 2A further comprises a user-defined HDR appearance preview section with a plurality of display regions (e.g., 208-1 through 208-3, etc.). The plurality of display regions can be used to display a plurality of (e.g., three, etc.) different types of mapped HDR images, such as dark, mid-tone and/or bright scene mapped HDR images. These mapped HDR images represent a previous of a (present) user-defined HDR appearance and allow the user to have an immediate visual feedback on how different types of mapped HDR images may be derived by backward reshaping different types of SDR images based on a (presently) modified backward reshaping curve comprising the plurality of sample points with the (present) user-adjusted mapped HDR values.

Additionally, optionally or alternatively, instead of or in addition to the preview of the user-defined HDR appearance, the modified (e.g., average adjusted, etc.) backward reshaping curve may be displayed.

In some operational scenarios, one or more constrains may be imposed on user adjustments $\{\delta_i\}$ of mapped HDR values of the sample point to help ensure that the modified backward reshaping curve is a monotonic function such as a non-decreasing function. For example, a simple constraint may be enforced on the user adjustments $\{\delta_i\}$ to be a non-decreasing sequence, as follows:

$$\delta_{min} \leq \delta_0 \leq \delta_1 \leq \ldots \leq \delta_{L-1} \leq \delta_{max} \qquad (54)$$

where $\delta_{min}$ and $\delta_{min}$ represent minimum and maximum (e.g., normalized, etc.) value adjustments such as −0.2 and +0.2, −0.4 and +0.4, etc.

Additionally, optionally or alternatively, a constraint may be enforced on the last or final adjusted sample point (after adding successively all preceding $\delta_i$) such that a mapped HDR value of the last or final adjusted sample point is within a specific HDR codeword value range such as defined by SMPTE 2084 or ITU-R Rec. BT. 2100.

Category Adjustment

The user may intend to create different HDR appearances for different categories of images. Example categories of images with different HDR appearances may include, but are not limited to, dark scenes, mid-tone scenes, bright scenes, face-present scenes, face-not-present scenes, landscape scenes, automatically generated image clusters, etc.

Figure 2B:
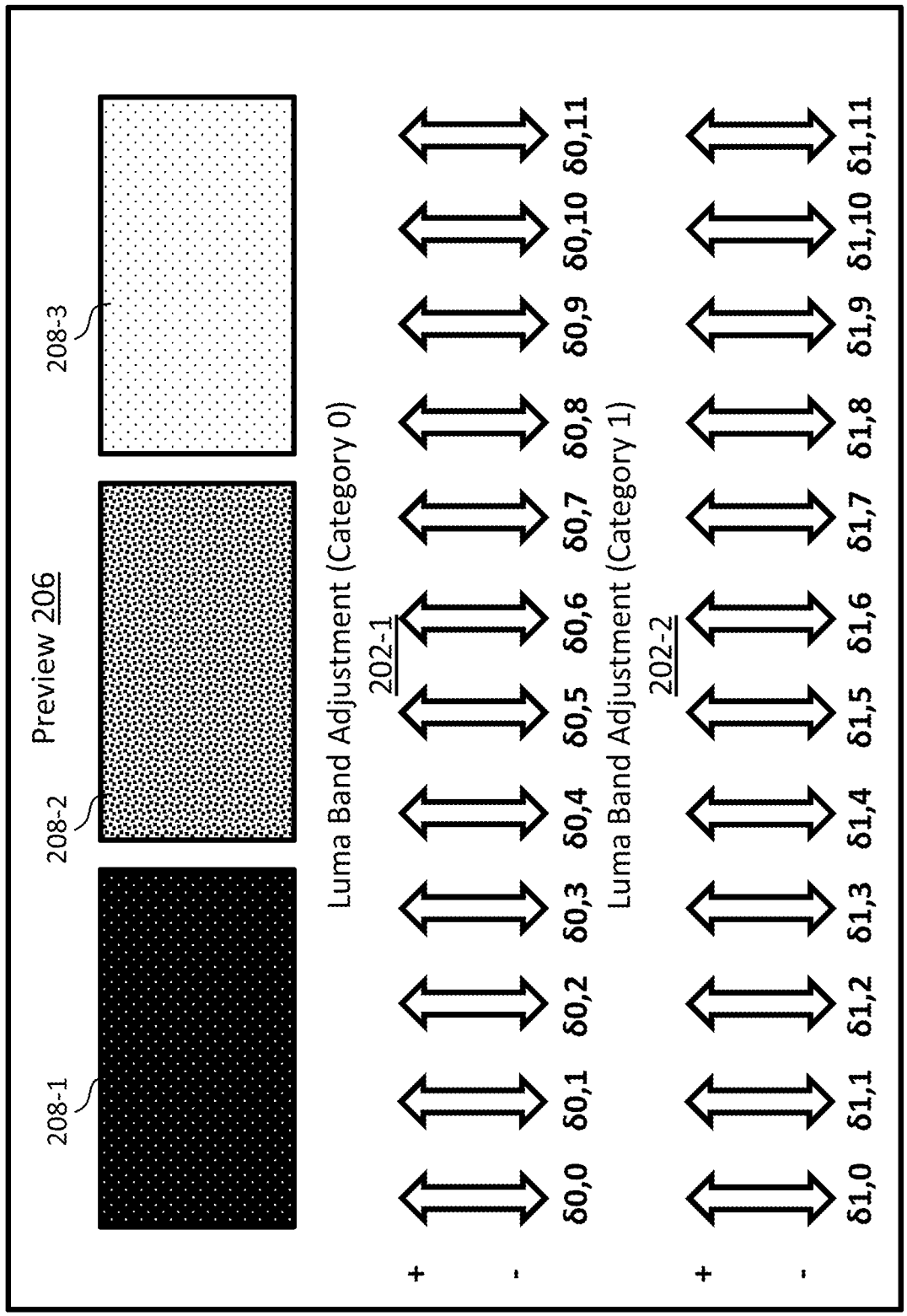

A simple solution is to create different adjustment slide bars for each category. As illustrated in FIG. 2B, a desired category-specific HDR appearance for a category 0 of images may be adjusted by a set of bars in a corresponding luma band adjustment section 202-1, whereas a desired category-specific HDR appearance for a category 1 of images may be adjusted by a set of bars in a corresponding luma band adjustment section 202-2.

Let $\Gamma_d$ be the d-th (e.g., mutually exclusive, etc.) subset of training SDR and HDR image pairs among a plurality of D subsets of training SDR and HDR image pairs from an (original) training dataset (which has F training SDR and HDR image pairs), where d is an integer between 1 and D. For each training SDR image (e.g., the j-th SDR image, etc.), a feature vector, $x_j$, may be extracted from each such training SDR image and used to categorize each training SDR and HDR image pair containing each such SDR image into a different subset among the D subsets.

By way of example but not limitation, an average luminance value (e.g., an average picture level or APL, etc.), denoted as $x_j^{avg}$, may be computed for each training SDR image and used as an indicator to classify a corresponding training SDR and HDR image pair containing each such training SDR image into a d-th subset denoted as $\Gamma_d$ among the foregoing described D subset, where the d-th subset $\Gamma_d$ may be delineated by $\{\lambda_{d-1}\}$ and $\{\lambda_d\}$ partition boundaries, as follows:

$$\Gamma_d = \{j | \lambda_{d-1} \leq x_j^{avg} < \lambda_d\} \qquad (55)$$

For each subset (or category of images) as indexed by d, the l-th sample point estimated or predicted by the l-th GPR model may be controlled by a user adjustment $\delta_{d,l}$. A mapped (or target) HDR value of the l-th sample point may be derived as follows:

$$\tilde{y}_j = y_j + \delta_{d,l} \text{ for } j \in \Gamma_d \qquad (56)$$

Then, an overall mapped (or target) HDR value vector can be constructed as follows:

$$\tilde{y}_l = y_l + \Delta \tilde{y} \qquad (57)$$

Note that user adjustments $\{\delta_{d,l}\}$ for the d-th subset (or categories of images) may still be constrained to be non-decreasing, as follows:

$$\delta_{min} \leq \delta_{d,0} \leq \delta_{d,1} \leq \ldots \delta_{d,L-1} \leq \delta_{max} \qquad (58)$$

However, adjusting each category of images with a constant for each sample point could cause visually perceptible issues such as transition issues for images with difference visual characteristics and features yet within the same boundaries of a category partition or between successive categories of images.

In some operational scenarios, instead of applying the same backward reshaping curve to all images of a given category as defined by category partition boundaries, a soft transition may be implemented using adjacent categories of images to ease or resolve these issues in the modified model for generating backward reshaping metadata.

For example, interpolation of user adjustments may be implemented based on feature vectors. Consider the d-th subset (or category of image), for the j-th image with an average luminance value $x_j^{avg}$ (an extracted feature) that is within two category partition boundaries ($\lambda_{d-1} \leq x_j^{avg} < \lambda_d$), a first distance to the center (denoted as $\omega_{d-1}$) of the left category and a second distance to the center ($\omega_d$) of the right category may be computed as follows:

$$\omega_{d-1} = x_j^{avg} - \frac{\lambda_{d-1} + \lambda_d}{2} \quad (59\text{-}1)$$

$$\omega_d = \frac{\lambda_d + \lambda_{d+1}}{2} - x_j^{avg} \quad (59\text{-}2)$$

A new user adjustment value for the j-th image ($\delta_{j,d,l}$) may be a weighted version of distances to the two neighboring centers $\omega_{d-1}$ and $\omega_d$, as follows:

$$\delta_{j,d,l} = \frac{\omega_d}{\omega_{d-1} + \omega_d} \delta_{d-1,l} + \frac{\omega_{d-1}}{\omega_{d-1} + \omega_d} \delta_{d,l} \quad (60)$$

In some operational scenarios, a GUI display page may be provided to allow the users to control some or all of the following quantities: partition boundary $\{\lambda_d\}$, $\{\delta_{d,l}\}$, and/or any partition boundary for categories that do not allow interpolation-based user adjustments; rather, the user can only generate (non-interpolation-based) user adjustments $\{\delta_{d,l}\}$ for images of these categories.

User Adjustment for Chroma

It should be noted that, as in the case of luma GPR models, updating (or generating modified) chroma dictionaries as described herein may be through complete direct (or repeated) re-training with new references or new targets that are updated (or modified) training HDR images in accordance with user-defined HDR appearance(s). However, such re-training may take a relatively long time to complete, need a relatively large amount of data to enable such re-training, and consume a relatively large amount of computing and other resources.

As previously noted, techniques as described herein can be used to relatively efficiently obtain modified (or user-updated) chroma dictionaries to be included a modified template (e.g., 146 of FIG. 1, for generating composer metadata or backward reshaping metadata, etc.) in accordance with a user-updated HDR appearance that may be different from the (reference) HDR appearance in training HDR images in a training data set.

Example user adjustments on the chroma dictionaries include, but are not necessarily limited to only, global user adjustments applicable to all clusters of images in a training dataset. These global user adjustments may include saturation adjustments to allow a user to globally adjust color saturations in different luma ranges, hue adjustments to allow a user to globally adjust hues in different luma ranges, for all the clusters of images in the training dataset.

In some operational scenarios, to carry out global user adjustments with saturation adjustment, a modified target chroma value vector for each image cluster (e.g., the c-th cluster, etc.)—or expected (or predicted) HDR values in connection with the (e.g., assumed, actual, etc.) modified training HDR images in each cluster after the user adjustments in accordance with the user-adjusted HDR appearance—can be constructed using addition as follows:

$$v''^{c0}_c = v'^{c0}_c + \Delta'^{c0}_c \quad (61\text{-}1)$$

$$v''^{c1}_c = v'^{c1}_c + \Delta'^{c1}_c \quad (61\text{-}2)$$

In some operational scenarios, to carry out global user adjustments with saturation adjustment, a modified target chroma value vector for each image cluster (e.g., the c-th cluster, etc.)—or expected (or predicted) HDR values in connection with the (e.g., assumed, actual, etc.) modified training HDR images in each cluster after the user adjustments in accordance with the user-adjusted HDR appearance—can be constructed using luma modulation functions as follows:

$$v''^{c0}_{t,c} = f^{c0}(s_t^y) \cdot (v'^{c0}_{t,c} - 0.5) \quad (62\text{-}1)$$

$$v''^{c1}_{t,c} = f^{c1}(s_t^y) \cdot (v'^{c1}_{t,c} - 0.5) + 0.5 \quad (62\text{-}2)$$

where the luma modulation functions $f^{c0}(\ )$ and $f^{c1}(\ )$ are scaling functions based (or dependent) on the luma. Expressions (62) above can be reduced to expressions (61) above by setting $f^{c0}(\ )=1$ and $f^{c1}(\ )=1$. In various embodiments, the luma modulation functions $f^{c0}(\ )$ and $f^{c1}(\ )$ of $s_t^y$ may be determined based on user input, determined based on heuristics, determined based on empirical studies of training data, etc. Additionally, optionally or alternatively, the luma modulation functions $f^{c0}(\ )$ and $f^{c1}(\ )$ can be represented as a lookup table.

In some operational scenarios, to carry out global user adjustments with hue adjustment, a simple solution may be implemented through rotation, as follows:

$$\begin{bmatrix} v''^{c0}_{t,c} - 0.5 \\ v''^{c0}_{t,c} - 0.5 \end{bmatrix} = \begin{bmatrix} \cos(\theta_{t,c}) & -\sin(\theta_{t,c}) \\ \sin(\theta_{t,c}) & \cos(\theta_{t,c}) \end{bmatrix} \begin{bmatrix} v'^{c0}_{t,c} - 0.5 \\ v'^{c0}_{t,c} - 0.5 \end{bmatrix} \quad (63)$$

where $\theta_{t,c}$ represents a luminance modification function of HDR luminance $s_t^y$, as follows:

$$\theta_{t,c} = g^h(s_t^y) \quad (64)$$

The luma modulation function $g^h(s_t^y)$ is a scaling function based (or dependent) on the luma. In various embodiments, the luma modulation function $g^h(s_t^y)$ of $s_t^y$ may be determined based on user input, determined based on heuristics, determined based on empirical studies of training data, etc. Additionally, optionally or alternatively, the luma modulation function $g^h(s_t^y)$ can be represented as a lookup table.

Local Adjustment

Similar to local user adjustments for luma, local user adjustments for chroma can operate on categories of images. In some operational scenarios, the categories of images in connection with the local user adjustments for chroma can be partitioned based on a cluster's SDR Cb/Cr values.

As previously noted, predicted or estimated HDR chroma codeword values in each cluster can be computed based on a combined SDR set, as follows:

$$v'^{c0}_c = G \cdot u_c^{c0,opt} \quad (65\text{-}1)$$

$$v'^{c1}_c = G \cdot u_c^{c1,opt} \quad (65\text{-}2)$$

where G is computed with a combined SDR set and applicable to each cluster.

Mean predicted or estimated HDR chroma codeword values for each channel in each cluster may be given as follows:

$$\bar{v}_c^{c0} = \sum_i (v'^{c0}_{c,i} - 0.5) \quad (66\text{-}1)$$

$$\bar{v}_c^{c1} = \sum_i (v'^{c1}_{c,i} - 0.5) \quad (66\text{-}2)$$

where i is a training image pair index of all training image pairs in each such cluster of training image pairs in the training dataset.

Figure 3A:
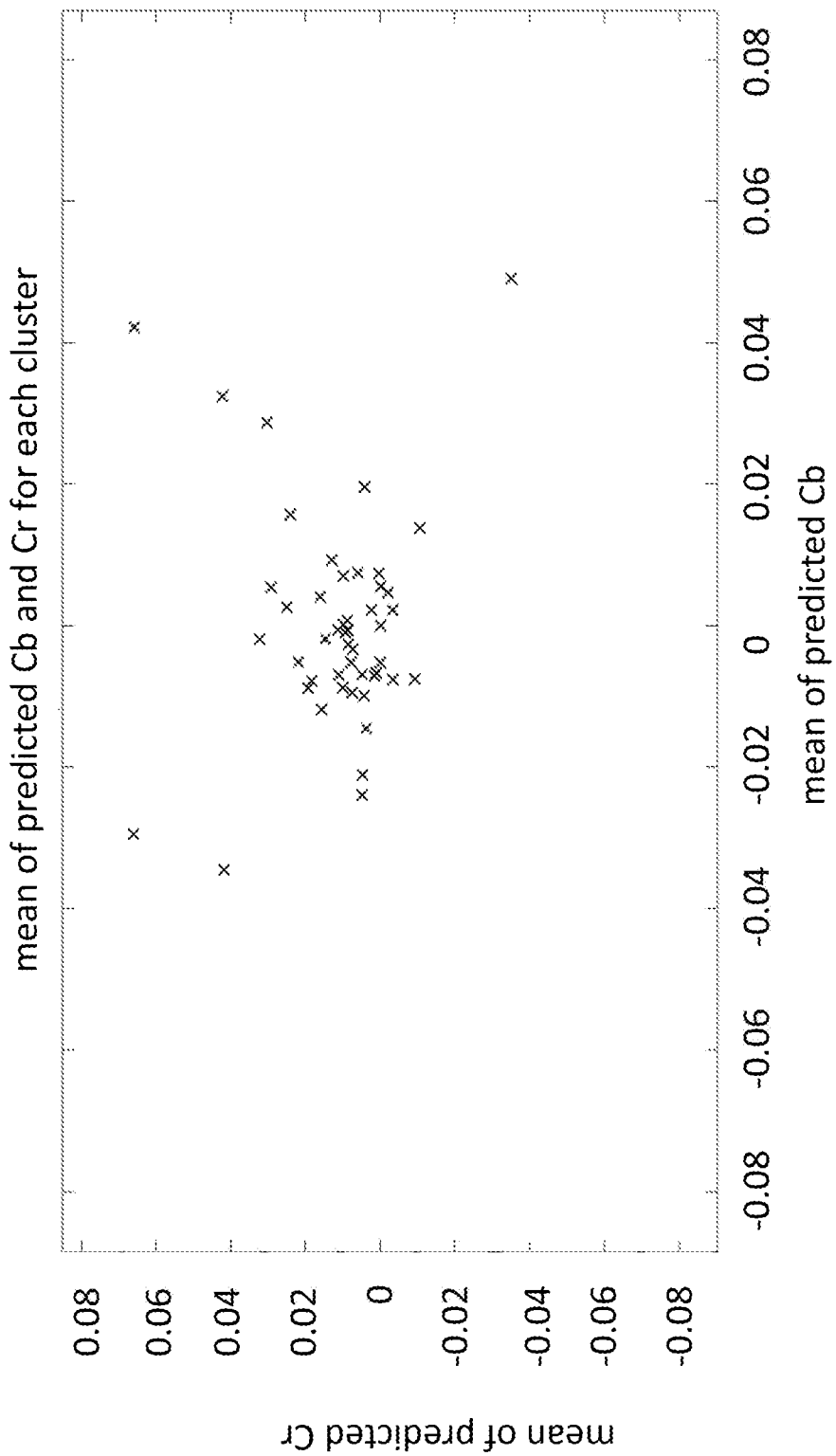
FIG. 3A illustrates an example distribution of mean predicted or estimated HDR chroma codeword values.

In some operational scenarios, local user adjustments for hue may be carried out with different regions of a distribution of $(\bar{v}_c^{c0}, \bar{v}_c^{c1})$ of the mean predicted or estimated HDR chroma codeword values $\{(\bar{v}_c^{c0}, \bar{v}_c^{c1})\}$ as illustrated in FIG. 3A. The distribution may be grouped or partitioned into multiple regions of $(\bar{v}_c^{c0}, \bar{v}_c^{c1})$, for example, based on angles of the mean predicted or estimated HDR chroma codeword values $\{(\bar{v}_c^{c0}, \bar{v}_c^{c1})\}$ relative to the horizontal axis of FIG. 3A. Each region in the multiple regions of the distribution of $(\bar{v}_c^{c0}, \bar{v}_c^{c1})$ of the mean predicted or estimated HDR chroma codeword values $\{(\bar{v}_c^{c0}, \bar{v}_c^{c1})\}$ can be adjusted independently.

For example, the $g^{th}$ region can be grouped or partitioned using lines passing through the coordinate origin (0, 0) in the Cartesian coordinates of FIG. 3A, as follows:

$$y = \lambda_g x \quad (67)$$

where x, y represents mean predicted or estimated HDR chroma codeword values $\bar{v}_c^{c0}$, $\bar{v}_c^{c1}$, respectively, that are close to a line with a slope $\lambda_g$ or that are deemed to be within the same $g^{th}$ region as characterized by the line with the slope $\lambda_g$.

Or in a polar coordinate system, an angle of mean predicted or estimated HDR chroma codeword values may be computed for each cluster as follows:

$$\theta_c = \tan^{-1}\left(\frac{\bar{v}_c^{c1}}{\bar{v}_c^{c0}}\right) \quad (68)$$

Figure 3B:
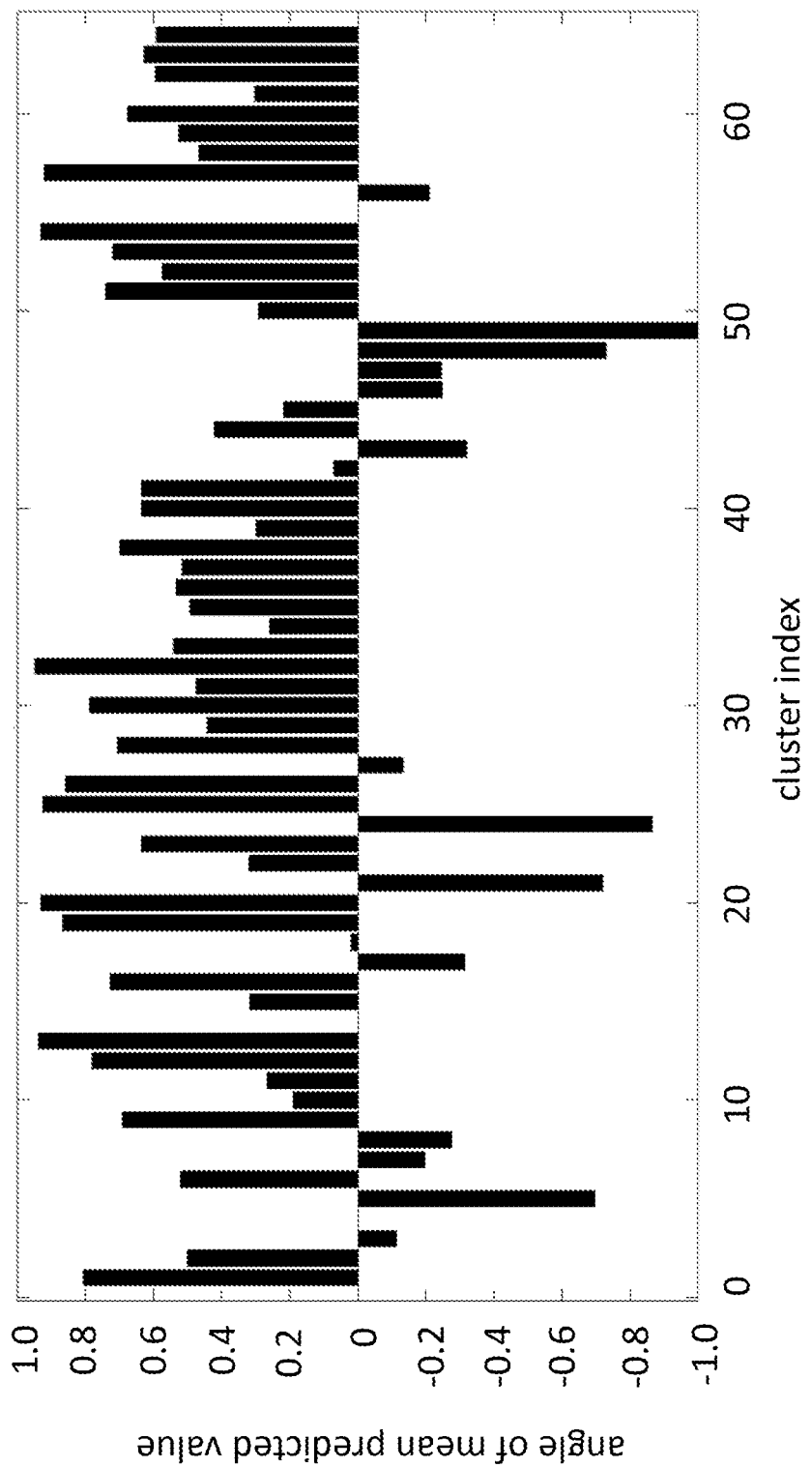
FIG. 3B illustrates an example distribution of angles for clusters.

FIG. 3B illustrates an example distribution of angles for clusters, where the angles may be computed using expression (68) above.

In both FIG. 3A and FIG. 3B, a system as described herein can interact with a user and allow the user to provide input to select the total number of regions and/or partition angle $\{\theta_g\}$ where g is in 0, . . . , G−1. Saturation and hue can be individually adjusted in each region.

Example Process Flows

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 402, an image processing system accesses a model template comprising backward reshaping metadata prediction models. The backward reshaping metadata prediction models are trained with a plurality of training image feature vectors from a plurality of training standard dynamic range (SDR) images in a plurality of training image pairs and ground truth derived with a plurality of corresponding training high dynamic range (HDR) images in the plurality of training image pairs. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges.

In block 404, the image processing system receives content creation user input that defines one or more content-creation-user-adjusted HDR appearances for the plurality of corresponding training HDR images.

In block 406, the image processing system generates, based on the model template and the content creation user input, content-creation-user-specific modified backward reshaping metadata prediction models.

In block 408, the image processing system uses the content-creation-user-specific modified backward reshaping metadata prediction models to predict operational parameter values of content-creation-user-specific backward reshaping mappings for backward reshaping SDR images into mapped HDR images of at least one of the one or more content-creation-user-adjusted HDR appearances.

In an embodiment, the one or more backward reshaping metadata prediction models comprise a plurality of Gaussian process regression (GPR) models for predicting a luminance backward reshaping mapping to backward reshape input luminance SDR codewords into mapped luminance HDR codewords. The content creation user input modifies a plurality of sample points of the luminance backward reshaping mapping.

In an embodiment, the plurality of sample points as modified by the content creation user input is constrained to maintain the luminance backward reshaping mapping as a monotonically increasing function.

In an embodiment, the plurality of image pairs is classified into a plurality of image categories; the content creation user input modifies the luminance backward reshaping mapping differently for at least two image categories in the plurality of image categories.

In an embodiment, the content creation user input modifies the luminance backward reshaping mapping that applies to all image pairs in the plurality of image pairs.

In an embodiment, the one or more backward reshaping metadata prediction models comprise a set of multivariate multiple regression (MMR) mapping matrixes for generating MMR coefficients to generate mapped chrominance HDR codewords from input SDR codewords; the content creation user input modifies a proper subset of MMR mapping matrixes in the set of MMR mapping matrixes with multiplicative operations; remaining MMR mapping matrixes in the set of MMR mapping matrixes are freed from being modified by the content creation user input.

In an embodiment, the plurality of image pairs is classified into a plurality of image categories; the content creation user input modifies the proper subset of MMR mapping matrixes differently for at least two image categories in the plurality of image categories.

In an embodiment, the plurality image categories is classified based on a plurality of regions each of which comprises a different group of mean predicted Cb values and mean predicted Cr values.

In an embodiment, the plurality image categories is classified based on a plurality of different angle sub-ranges formed by different combinations of mean predicted Cb values and mean predicted Cr values.

In an embodiment, the content creation user input modifies the proper set of MMR mapping matrixes that applies to all image pairs in the plurality of image pairs.

In an embodiment, the image processing system is further configured to perform: encoding one or more of the operational parameter values of backward reshaping mappings used to backward reshape SDR images into mapped HDR images into a video signal, along with the SDR images, as image metadata. The video signal causes one or more recipient devices to render display images derived from the mapped HDR images with one or more display devices.

In an embodiment, the backward reshaping metadata prediction models in the model template comprise a set of hyperparameter values and a set of weight factor values; the content-creation-user-specific modified backward reshaping metadata prediction models are derived from the backward reshaping metadata prediction models in the model template by altering the set of weight factor values while maintaining the set of hyperparameter values unchanged.

Figure 4B:
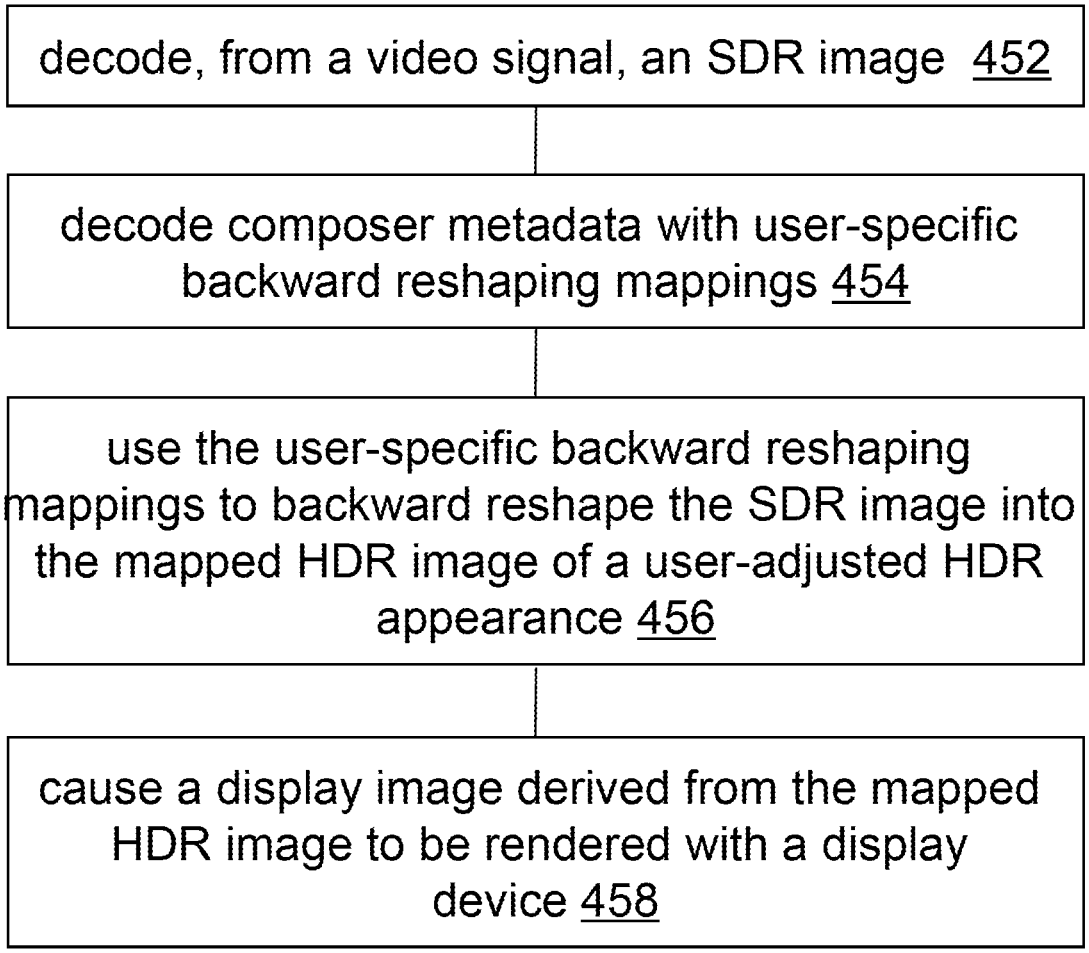

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes, from a video signal, a standard dynamic range (SDR) image to be backward reshaped into a corresponding mapped high dynamic range (HDR) image.

In block 454, the video decoding system decodes, from the video signal, composer metadata that is used to derive one or more operational parameter values of content-user-specific backward reshaping mappings.

The one or more operational parameter values of content-user-specific backward reshaping mappings are predicted by one or more content-creation-user-specific modified backward reshaping metadata prediction models.

The one or more content-creation-user-specific modified backward reshaping metadata prediction models are generated based on a model template and content creation user input.

The model template includes backward reshaping metadata prediction models. The backward reshaping metadata prediction models are trained with a plurality of training image feature vectors from a plurality of training SDR images in a plurality of training image pairs and ground truth derived with a plurality of corresponding training HDR images in the plurality of training image pairs; each training image pair in the plurality of training image pairs comprises a training SDR image in the plurality of training SDR images and a corresponding training HDR image in the plurality of corresponding training HDR images; the training SDR image and the corresponding training HDR image in each such training image pair depict same visual content but with different luminance dynamic ranges.

Content creation user input modifies the plurality of corresponding training HDR images into one or more content-creation-user-adjusted HDR appearances.

In block 456, the video decoding system uses the one or more operational parameter values of the content-user-specific backward reshaping mappings to backward reshape the SDR image into the mapped HDR image of at least one of the one or more content-creation-user-adjusted HDR appearances.

In block 458, the video decoding system causes a display image derived from the mapped HDR image to be rendered with a display device.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
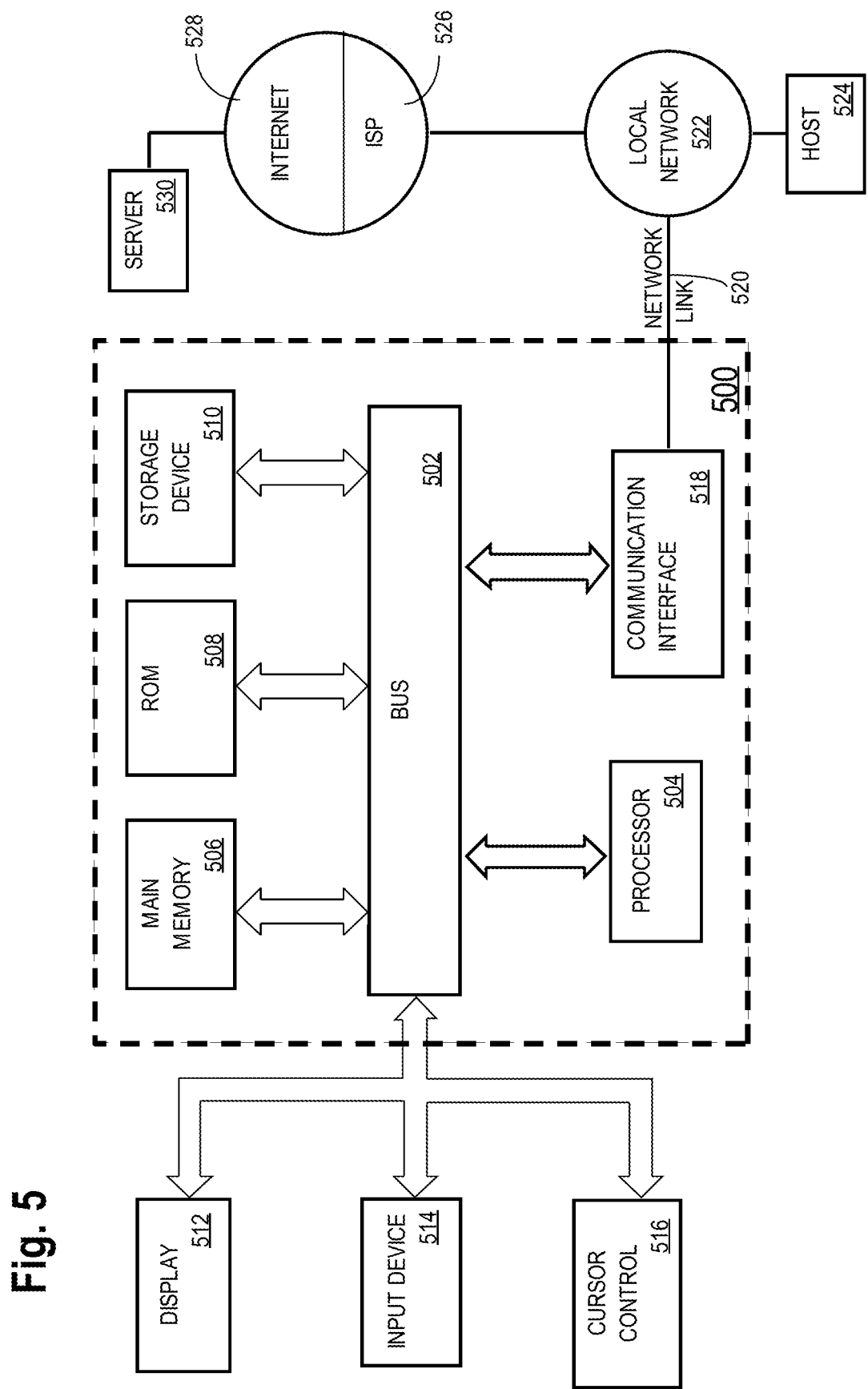
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of embodiments of the present invention.

EEE1. A method comprising:
  accessing a model template comprising backward reshaping metadata prediction models, wherein the backward reshaping metadata prediction models are trained with a plurality of training image feature vectors from a plurality of training standard dynamic range (SDR) images in a plurality of training image pairs and ground truth derived with a plurality of corresponding training high dynamic range (HDR) images in the plurality of training image pairs, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;
  receiving content creation user input to define one or more content-creation-user-adjusted HDR appearances for the plurality of corresponding training HDR images;
  generating, based on the model template and the content creation user input, content-creation-user-specific modified backward reshaping metadata prediction models;
  using the content-creation-user-specific modified backward reshaping metadata prediction models to predict operational parameter values of content-creation-user-specific backward reshaping mappings for backward reshaping SDR images into mapped HDR images of at least one of the one or more content-creation-user-adjusted HDR appearances.

EEE2. The method of EEE1, wherein the one or more backward reshaping metadata prediction models comprise a plurality of Gaussian process regression (GPR) models for predicting a luminance backward reshaping mapping to backward reshape input luminance SDR codewords into mapped luminance HDR codewords; wherein the content creation user input modifies a plurality of sample points of the luminance backward reshaping mapping.

EEE3. The method of EEE2, wherein the plurality of sample points as modified by the content creation user input is constrained to maintain the luminance backward reshaping mapping as a monotonically increasing function.

EEE4. The method of EEE2, wherein the plurality of image pairs is classified into a plurality of image categories; wherein the content creation user input modifies the luminance backward reshaping mapping differently for at least two image categories in the plurality of image categories.

EEE5. The method of EEE2, wherein the content creation user input modifies the luminance backward reshaping mapping that applies to all image pairs in the plurality of image pairs.

EEE6. The method of EEE1, wherein the one or more backward reshaping metadata prediction models comprise a set of multivariate multiple regression (MMR) mapping matrixes for generating MMR coefficients to generate mapped chrominance HDR codewords from input SDR codewords; wherein the content creation user input modifies a proper subset of MMR mapping matrixes in the set of MMR mapping matrixes with multiplicative operations; wherein remaining MMR mapping matrixes in the set of MMR mapping matrixes are freed from being modified by the content creation user input.

EEE7. The method of EEE6, wherein the plurality of image pairs is classified into a plurality of image categories; wherein the content creation user input modifies the proper subset of MMR mapping matrixes differently for at least two image categories in the plurality of image categories.

EEE8. The method of EEE7, wherein the plurality image categories is classified based on a plurality of regions each of which comprises a different group of mean predicted Cb values and mean predicted Cr values.

EEE9. The method of EEE7, wherein the plurality image categories is classified based on a plurality of different angle sub-ranges formed by different combinations of mean predicted Cb values and mean predicted Cr values.

EEE10. The method of EEE6, wherein the content creation user input modifies the proper set of MMR mapping matrixes that applies to all image pairs in the plurality of image pairs.

EEE11. The method of EEE1, further comprising: encoding one or more of the operational parameter values of backward reshaping mappings used to backward reshape SDR images into mapped HDR images into a video signal, along with the SDR images, as image metadata, wherein the video signal causes one or more recipient devices to render display images derived from the mapped HDR images with one or more display devices.

EEE12. The method of EEE1, wherein the backward reshaping metadata prediction models in the model template comprise a set of hyperparameter values and a set of weight factor values; wherein the content-creation-user-specific modified backward reshaping metadata prediction models are derived from the backward reshaping metadata prediction models in the model template by altering the set of weight factor values while maintaining the set of hyperparameter values unchanged.

EEE13. A method comprising:
decoding, from a video signal, a standard dynamic range (SDR) image to be backward reshaped into a corresponding mapped high dynamic range (HDR) image;
decoding, from the video signal, composer metadata that is used to derive one or more operational parameter values of content-user-specific backward reshaping mappings;
wherein the one or more operational parameter values of content-user-specific backward reshaping mappings are predicted by one or more content-creation-user-specific modified backward reshaping metadata prediction models;
wherein the one or more content-creation-user-specific modified backward reshaping metadata prediction models are generated based on a model template and content creation user input;
wherein the model template includes backward reshaping metadata prediction models, wherein the backward reshaping metadata prediction models are trained with a plurality of training image feature vectors from a plurality of training SDR images in a plurality of training image pairs and ground truth derived with a plurality of corresponding training HDR images in the plurality of training image pairs, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;
wherein content creation user input modifies the plurality of corresponding training HDR images into one or more content-creation-user-adjusted HDR appearances;
using the one or more operational parameter values of the content-user-specific backward reshaping mappings to backward reshape the SDR image into the mapped HDR image of at least one of the one or more content-creation-user-adjusted HDR appearances;
causing a display image derived from the mapped HDR image to be rendered with a display device.

EEE14. A computer system configured to perform any one of the methods recited in EEE1-EEE13.

EEE15. An apparatus comprising a processor and configured to perform any one of the methods recited in EEE1-EEE13.

EEE16. A non-transitory computer-readable storage medium having stored thereon computer-executable instruction for executing a method in accordance with any of the methods recited in EEE1-EEE13.

The invention claimed is:
1. A method comprising:
accessing a model template comprising backward reshaping metadata prediction models, wherein the backward reshaping metadata prediction models are trained with a plurality of training image feature vectors from a plurality of training standard dynamic range (SDR) images in a plurality of training image pairs and ground truth derived with a plurality of corresponding training high dynamic range (HDR) images in the plurality of training image pairs, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;
receiving content creation user input that defines one or more content-creation-user-adjusted HDR appearances for the plurality of corresponding training HDR images;
generating, based on the model template and the content creation user input, content-creation-user-specific modified backward reshaping metadata prediction models; and
using the content-creation-user-specific modified backward reshaping metadata prediction models to predict operational parameter values of content-creation-user-specific backward reshaping mappings for backward reshaping SDR images into mapped HDR images of at least one of the one or more content-creation-user-adjusted HDR appearances, wherein the backward reshaping metadata prediction models comprise a plurality of Gaussian process regression (GPR) models for predicting a luminance backward reshaping mapping to backward reshape input luminance SDR codewords into mapped luminance HDR codewords, and the content creation user input modifies a plurality of sample points of the luminance backward reshaping mapping.

2. The method of claim 1, wherein the plurality of sample points as modified by the content creation user input is constrained to maintain the luminance backward reshaping mapping as a monotonically increasing function.

3. The method of claim 1, wherein the plurality of image pairs is classified into a plurality of image categories; wherein the content creation user input modifies the luminance backward reshaping mapping differently for at least two image categories in the plurality of image categories.

4. The method of claim 1, wherein the content creation user input modifies the luminance backward reshaping mapping that applies to all image pairs in the plurality of image pairs.

5. The method of claim 1, wherein the one or more backward reshaping metadata prediction models comprise a set of multivariate multiple regression (MMR) mapping matrixes for generating MMR coefficients to generate mapped chrominance HDR codewords from input SDR codewords; wherein the content creation user input modifies a proper subset of MMR mapping matrixes in the set of MMR mapping matrixes with multiplicative operations; wherein remaining MMR mapping matrixes in the set of MMR mapping matrixes are freed from being modified by the content creation user input.

6. The method of claim 5, wherein the plurality of image pairs is classified into a plurality of image categories; wherein the content creation user input modifies the proper subset of MMR mapping matrixes differently for at least two image categories in the plurality of image categories.

7. The method of claim 6, wherein the plurality image categories is classified based on a plurality of regions each of which comprises a different group of mean predicted Cb values and mean predicted Cr values.

8. The method of claim 6, wherein the plurality image categories is classified based on a plurality of different angle sub-ranges formed by different combinations of mean predicted Cb values and mean predicted Cr values.

9. The method of claim 5, wherein the content creation user input modifies the proper set of MMR mapping matrixes that applies to all image pairs in the plurality of image pairs.

10. The method of claim 1, further comprising: encoding one or more of the operational parameter values of backward reshaping mappings used to backward reshape SDR images into mapped HDR images into a video signal, along with the SDR images, as image metadata, wherein the video signal causes one or more recipient devices to render display images derived from the mapped HDR images with one or more display devices.

11. The method of claim 1, wherein the backward reshaping metadata prediction models in the model template comprise a set of hyperparameter values and a set of weight factor values; wherein the content-creation-user-specific modified backward reshaping metadata prediction models are derived from the backward reshaping metadata prediction models in the model template by altering the set of weight factor values while maintaining the set of hyperparameter values unchanged.

12. An apparatus comprising a processor and configured to perform the method recited in claim 1.

13. A non-transitory computer-readable storage medium having stored thereon computer-executable instruction for executing a method with one or more processors in accordance with the method recited in claim 1.

14. A method comprising:
decoding, from a video signal, a standard dynamic range (SDR) image to be backward reshaped into a corresponding mapped high dynamic range (HDR) image;
decoding, from the video signal, composer metadata that is used to derive one or more operational parameter values of content-user-specific backward reshaping mappings;
wherein the one or more operational parameter values of content-user-specific backward reshaping mappings are predicted by one or more content-creation-user-specific modified backward reshaping metadata prediction models;
wherein the one or more content-creation-user-specific modified backward reshaping metadata prediction models are generated based on a model template and content creation user input;
wherein the model template includes backward reshaping metadata prediction models, wherein the backward reshaping metadata prediction models are trained with a plurality of training image feature vectors from a plurality of training SDR images in a plurality of training image pairs and ground truth derived with a plurality of corresponding training HDR images in the plurality of training image pairs, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges,
wherein the backward reshaping metadata prediction models comprise a plurality of Gaussian process regression (GPR) models for predicting a luminance backward reshaping mapping to backward reshape input luminance SDR codewords into mapped luminance HDR codewords,
wherein content creation user input modifies the plurality of corresponding training HDR images into one or more content-creation-user-adjusted HDR appearances;
using the one or more operational parameter values of the content-user-specific backward reshaping mappings to backward reshape the SDR image into the mapped HDR image of at least one of the one or more content-creation-user-adjusted HDR appearances; and
causing a display image derived from the mapped HDR image to be rendered with a display device.

* * * * *